United States Patent
Zheng

(10) Patent No.: US 12,531,638 B2
(45) Date of Patent: Jan. 20, 2026

(54) COMMUNICATION METHOD AND RELATED DEVICE

(71) Applicant: Huawei Technologies Co., Ltd., Shenzhen (CN)

(72) Inventor: Gang Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 260 days.

(21) Appl. No.: 18/489,235

(22) Filed: Oct. 18, 2023

(65) Prior Publication Data

US 2024/0048240 A1    Feb. 8, 2024

Related U.S. Application Data

(63) Continuation of application No. PCT/CN2022/087553, filed on Apr. 19, 2022.

(30) Foreign Application Priority Data

Apr. 19, 2021    (CN) .......................... 202110419555.X
Apr. 12, 2022    (CN) .......................... 202210379386.6

(51) Int. Cl.
*H04B 10/278*    (2013.01)
*H04B 10/40*    (2013.01)

(52) U.S. Cl.
CPC ........... *H04B 10/278* (2013.01); *H04B 10/40* (2013.01)

(58) Field of Classification Search
CPC ............................... H04B 10/40; H04B 10/278
USPC ............................................................ 398/60
See application file for complete search history.

(56) References Cited

U.S. PATENT DOCUMENTS

| | | | | |
|---|---|---|---|---|
| 9,319,236 | B2* | 4/2016 | Griswold | H04L 12/2872 |
| 11,196,583 | B2* | 12/2021 | Haag | H04L 41/0806 |
| 2008/0292313 | A1* | 11/2008 | Mahony | H04J 14/0247 398/52 |
| 2009/0269063 | A1* | 10/2009 | Bernard | H04Q 11/0067 398/66 |
| 2013/0315587 | A1* | 11/2013 | Mukai | H04J 14/0247 398/45 |
| 2017/0117965 | A1 | 4/2017 | Fujino et al. | |

FOREIGN PATENT DOCUMENTS

| | | |
|---|---|---|
| CN | 106873553 A | 6/2017 |
| CN | 207819935 U | 9/2018 |
| EP | 2424134 A1 | 2/2012 |
| EP | 2713628 A2 | 4/2014 |

* cited by examiner

*Primary Examiner* — Dalzid E Singh
(74) *Attorney, Agent, or Firm* — Slater Matsil, LLP

(57) ABSTRACT

In a method, an optical head end first determines a first correspondence, where the first correspondence indicates a correspondence between a slave station device identifier and a slave station node identifier. Then the optical head end receives a first message from an optical terminal, where the first message includes device information, the device information includes a first device identifier, and the first device identifier indicates a first slave station connected to the optical terminal. Then, the optical head end determines, from the first correspondence, a first node identifier corresponding to the first device identifier. Further, the optical head end sends the first node identifier to the optical terminal.

20 Claims, 11 Drawing Sheets

PLC and optical head end separated architecture

PLC and optical head end
integrated architecture

… (US 12,531,638 B2)

COMMUNICATION METHOD AND RELATED DEVICE

CROSS-REFERENCE TO RELATED APPLICATIONS

This application is a continuation of International Application No. PCT/CN2022/087553, filed on Apr. 19, 2022, which claims priorities to Chinese Patent Application No. 202210379386.6, filed on Apr. 12, 2022 and Chinese Patent Application No. 202110419555.X, filed on Apr. 19, 2021. All of the aforementioned patent applications are hereby incorporated by reference in their entireties.

TECHNICAL FIELD

This application relates to the field of communication technologies, and in particular, to a communication method and a related device.

BACKGROUND

A field bus network, also referred to as a field bus, is a basic network of devices, and may generally indicate a bidirectional multi-node digital communication technology applied to production sites and implemented between field devices and between field devices and control apparatuses.

Generally, the field bus network generally includes a slave station and a master station for controlling the slave station. The slave station may include a sensor, a server, an input/output (I/O) device, and the like. Currently, in the field bus network, communication between the master station and the slave station may be performed through a twisted pair connection, to implement management for the slave station.

However, due to hardware characteristics of the twisted pair, an operation periodicity of a current field bus network is at millisecond (ms) level, failing to meet a higher-level low-latency requirement of future industrial manufacturing. Therefore, how to manage the slave station through lower-delay communication in a field bus network is a technical problem to be urgently resolved.

SUMMARY

Embodiments of this application provide a communication method and a related device, to implement management for a slave station through optical fiber communication. Compared with a conventional communication manner of using a twisted pair connection in a field bus network, this can greatly reduce a transmission delay, and communication efficiency.

A first aspect of embodiments of this application provides a communication method. The method may be performed by an optical head end, or may be performed by a component (for example, a processor, a chip, or a chip system) of the optical head end. The method includes: The optical head end first determines a first correspondence, where the first correspondence indicates a correspondence between a slave station device identifier and a slave station node identifier. Then the optical head end receives a first message from an optical terminal, where the first message includes device information, the device information includes a first device identifier, and the first device identifier indicates a first slave station connected to the optical terminal. Then, the optical head end determines, from the first correspondence, a first node identifier corresponding to the first device identifier. Further, the optical head end sends the first node identifier to the optical terminal.

Based on the foregoing technical solution, the optical head end first determines the first correspondence including the correspondence between the slave station device identifier and the slave station node identifier, where the first correspondence is used to configure the slave station to go online. Then, in a process in which the first slave station goes online, the optical head end receives, from the optical terminal through an optical fiber communication connection with the optical terminal, the first message including the first device identifier; and determines, from the first correspondence, the first node identifier corresponding to the first device identifier. Further, the optical head end sends the first node identifier to the optical terminal through the optical fiber communication connection with the optical terminal. The first slave station is configured to go online through optical fiber communication between the optical head end and the optical terminal end, that is, management for a slave station is implemented through optical fiber communication. Compared with a conventional communication manner of using a twisted pair connection in a field bus network, this can greatly reduce a transmission delay, and improve communication efficiency.

In a possible implementation of the first aspect of embodiments of this application, that the optical head end determines a first correspondence includes: The optical head end receives the first correspondence from a programmable logic controller (PLC).

It should be noted that, the PLC may manage the slave station through programming and management of a plurality of industrial network control modules, and may incorporate a part of calculation of the industrial control modules in the PLC. The PLC may be integrated into the optical head end as a module (for example, a virtual programmable logic controller (vPLC) module) of the optical head end for implementation. Alternatively, the PLC may be integrated into another device separate from the optical head end. This is not limited herein.

Based on the foregoing technical solution, the first correspondence including the correspondence between the slave station device identifier and the slave station node identifier may be configured using the PLC, so that an operator can manage one or more optical head ends by setting the PLC on the PLC.

In a possible implementation of the first aspect of embodiments of this application, after the optical head end sends the first node identifier to the optical terminal, the method further includes: sending a notification message to the PLC, where the notification message indicates the first slave station to go online, and the notification message includes the first node identifier.

Based on the foregoing technical solution, after the optical head end sends the first node identifier to the optical terminal, the optical head end may send, to the PLC, the notification message that indicates the first slave station to go online, so that the PLC determines that the first slave station has gone online. Subsequently, the PLC may implement another management operation on the first slave station, for example, exchange of device capability information, exchange of process data object (PDO) configuration information, and exchange of PDO data.

In a possible implementation of the first aspect of embodiments of this application, after the optical head end sends the first node identifier to the optical terminal, the method further includes: The optical head end sends first indication information to the optical terminal, where the first indication information is used to request device capability information of the first slave station. Then the optical head end receives the device capability information from the optical terminal.

Based on the foregoing technical solution, after the optical head end sends the first node identifier to the optical terminal, that is, after the optical head end determines that the first slave station goes online, the optical head end may further obtain the device capability information of the first slave station through the optical communication connection with the optical terminal, so that the optical head end may subsequently implement another management operation on the first slave station based on the device capability information of the first slave station, for example, the exchange of the PDO configuration information and the exchange of the PDO data.

In a possible implementation of the first aspect of embodiments of this application, the method further includes: The optical head end sends the device capability information to the PLC.

Based on the foregoing technical solution, after the optical head end obtains the device capability information of the first slave station, the optical head end may send the device capability information to the PLC, so that the PLC may implement another management operation on the first slave station based on the device capability information.

In a possible implementation of the first aspect of embodiments of this application, before the optical head end sends first indication information to the optical terminal, the method further includes: The optical head end receives the first indication information from the PLC.

Based on the foregoing technical solution, the optical head end may send, to the optical terminal based on an indication of the PLC, the first indication information used to request the device capability information of the first slave station.

In a possible implementation of the first aspect of embodiments of this application, after the optical head end sends the first node identifier to the optical terminal, the method further includes: The optical head end determines PDO configuration information of the first slave station. The optical head end sends the PDO configuration information to the optical terminal.

Based on the foregoing technical solution, after the optical head end sends the first node identifier to the optical terminal, that is, after the optical head end determines that the first slave station goes online, the optical head end may determine the PDO configuration information of the first slave station and send the PDO configuration information to the optical terminal, so that the exchange of the PDO data can be subsequently performed between the optical head end and the optical terminal based on the PDO configuration information.

In a possible implementation of the first aspect of embodiments of this application, the PDO configuration information includes at least one of the following: a sending periodicity of PDO data, a memory access address of the PDO data, and mapping of a PDO data object.

Based on the foregoing technical solution, the PDO configuration information may specifically include a sending periodicity of PDO data, a memory access address of the PDO data, and mapping of a PDO data object, and/or other PDO configuration information, which provides a plurality of flexible implementations of the PDO configuration information.

In a possible implementation of the first aspect of embodiments of this application, the optical head end determines PDO configuration information of the first slave station includes: The optical head end receives the PDO configuration information of the first slave station from the PLC.

Based on the foregoing technical solution, the optical head end may determine the PDO configuration information of the first slave station based on configuration of the PLC, and after determining that the first slave station goes online, send the PDO configuration information of the first slave station to the first slave station, so that the PLC and the first slave station may subsequently perform the exchange of the PDO data based on the PDO configuration information through the optical fiber communication connection between the optical head end and the optical terminal.

In a possible implementation of the first aspect of embodiments of this application, before the optical head end sends the first node identifier to the optical terminal, the method further includes: The optical head end determines a second correspondence, where the second correspondence indicates a correspondence between the optical terminal and at least one slave station connected to the optical terminal, and the at least one slave station includes the first slave station.

Based on the foregoing technical solution, the optical terminal may be connected to the at least one slave station to implement communication with the at least one slave station, that is, one optical terminal may correspond to one or more slave stations. Before the optical head end sends the first node identifier to the optical terminal, that is, before the optical head end determines that the first slave station goes online, the optical head end may determine the correspondence between the optical terminal and the at least one slave station connected to the optical terminal through pre-configuration in the optical head end, or through configuration for the optical head end using the PLC. Subsequently, the optical head end may determine, based on the correspondence, the first slave station from the at least one slave station corresponding to the optical terminal, and implements management of the first slave station.

In a possible implementation of the first aspect of embodiments of this application, the first node identifier is carried in an optical network terminal management and control interface OMCI message, and the OMCI message further includes a gigabit passive optical network encapsulation mode port identifier GEMport ID. Alternatively, the first node identifier is carried in an operation, administration, and maintenance OAM message, and the OAM message further includes a logical link identifier LLID.

Based on the foregoing technical solution, the optical head end and the optical terminal may be implemented in a plurality of communication manners. When the communication manner is a gigabit PON (gigabit passive optical network, GPON) in a passive optical network (PON) or another PON network, the first node identifier sent by the optical head end to the optical terminal may be carried in the optical network terminal management and control interface (OMCI) message, where the OMCI message carries the gigabit passive optical network encapsulation mode port identifier (GEMport ID). When the communication manner is an Ethernet PON (ethernet passive optical network, EPON), a 10 gigabit Ethernet PON (10G ethernet passive optical network, 10G-EPON), or another EPON network, the first node identifier sent by the optical head end to the optical terminal may be carried in an optical network terminal management and control interface (OAM) message, where the OAM message carries the logical link identifier (LLID).

In a possible implementation of the first aspect of embodiments of this application, the first correspondence is carried in an optical bus link layer message, and the optical bus link layer message includes at least one of the following: a destination media access control (MAC) address, a media access control MAC address of the PLC, an Ethernet type, a protocol data unit PDU quantity, a timestamp, and a frame check sequence.

Optionally, the destination MAC address may indicate one or more MAC addresses of the optical head end.

Based on the foregoing technical solution, in the optical bus link used for communication between the PLC and the optical head end, a sent optical bus link layer message may carry at least one of the foregoing information, providing flexible implementations of the optical bus link layer message.

In a possible implementation of the first aspect of embodiments of this application, the first node identifier includes at least one of the following: a type identifier, a length value, a MAC address, and a node identifier.

Optionally, the MAC address may indicate a MAC address of the optical terminal or the first slave station.

Based on the foregoing technical solution, the first node identifier allocated by the optical head end to the first slave station based on the first correspondence may include at least one of the foregoing information, providing flexible implementations of the first node identifier.

In a possible implementation of the first aspect of embodiments of this application, the device information includes at least one of the following: a type identifier, a length value, a node identifier, a vendor identifier of the optical terminal or the first slave station, a MAC address of the optical terminal or the first slave station, an OT model of the optical terminal, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

Based on the foregoing technical solution, the device information from the optical terminal that is received by the optical head end may include at least one of the foregoing information, and the first device identifier may include partial information of the foregoing device information, providing flexible implementations of the device information.

In a possible implementation of the first aspect of embodiments of this application, the method further includes: The optical head end sends second indication information to the optical terminal, where the second indication information indicates the first slave station to enter an emergency state.

Optionally, the second indication information indicates the first slave station to enter an emergency state, and may specifically indicate the first slave station to enter an emergency-stop state. In the emergency-stop state, the first slave station no longer periodically performs an action, and turns off or shuts down the action performed by the first slave station, to avoid damage to persons or machines.

Based on the foregoing technical solution, the optical head end that manages the first slave station may send the second indication information to the optical terminal to indicate the first slave station to enter the emergency state, so that the first slave station connected to the optical terminal enters a security protection state, to avoid damage to persons or machines.

Optionally, the method further includes: The optical head end receives the second indication information from the PLC.

In a possible implementation of the first aspect of embodiments of this application, after the optical head end sends the first node identifier to the optical terminal, the method further includes: The optical head end sends third indication information to the optical terminal, where the third indication information is used to request process data PDO of the first slave station. The optical head end receives the PDO from the optical terminal.

Based on the foregoing technical solution, after the optical head end sends the first node identifier to the optical terminal, that is, after the optical head end determines that the first slave station goes online, the optical head end may send, to the optical terminal, the third indication information used to request the PDO of the first slave station, and receive the PDO from the terminal, to implement the exchange of the PDO data and management of the first slave station.

In a possible implementation of the first aspect of embodiments of this application, the method further includes: The optical head end sends the PDO to the PLC.

Based on the foregoing technical solution, the optical head end may determine the PDO configuration information of the first slave station based on the configuration of the PLC, and after determining that the first slave station goes online and receives the PDO of the first slave station, send the PDO to the PLC, so that the PLC manages the first slave station.

In a possible implementation of the first aspect of embodiments of this application, before the optical head end sends third indication information to the optical terminal, the method further includes: The optical head end receives the third indication information from the PLC.

Based on the foregoing technical solution, the optical head end may determine the PDO configuration information of the first slave station based on the configuration of the PLC, and after determining that the first slave station goes online, may send, to the optical head end based on the indication of the PLC, the third indication information used to request the PDO of the first slave station.

In a possible implementation of the first aspect of embodiments of this application, before the optical head end sends third indication information to the optical terminal, the method further includes: The optical head end sends fourth indication information to the optical terminal, where the fourth indication information indicates the first slave station to enter an operation state.

Optionally, that the first slave station enters the operation state may indicate the first slave station to start a field bus to work.

Based on the foregoing technical solution, after the optical head end sends the first node identifier to the optical terminal, that is, after the optical head end determines that the first slave station goes online, the optical head end may send the fourth indication information to the optical terminal to indicate the first slave station to enter the operation state, and perform the exchange of the PDO data based on the third indication information after the first slave station enters the operation state.

Optionally, the method further includes: The optical head end receives the fourth indication information from the PLC.

A second aspect of embodiments of this application provides a communication method. The method may be performed by a PLC, or may be performed by a component (for example, a processor, a chip, or a chip system) of the PLC. The method includes: A programmable logic controller PLC sends a first correspondence to an optical head end, where the first correspondence indicates a correspondence between a slave station device identifier and a slave station node identifier, the correspondence indicates that at least a first device identifier corresponds a first node identifier, and the first device identifier indicates a first slave station connected to an optical terminal. Then, the PLC receives a notification message from the optical head end, where the notification message indicates the first slave station to go online, and the notification message includes the first node identifier.

Based on the foregoing technical solution, the PLC first sends, to the optical head end, the first correspondence including the correspondence between the slave station device identifier and the slave station node identifier, where the first correspondence is used to configure the slave station to go online. Then, in a process in which the first slave station goes online, after the optical head end configures the first slave station to go online through an optical fiber communication connection with the optical terminal, the PLC receives, from the optical head end, the notification message including the first slave station to go online, so that an operator can manage one or more optical head ends by setting the PLC on the PLC. A management process of the slave station is implemented between the optical head end and the optical terminal through optical fiber communication. Compared with a conventional communication manner of using a twisted pair connection in a field bus network, this can greatly improve a transmission delay, and improve communication efficiency.

It should be noted that, the PLC may manage the slave station through programming and management of a plurality of industrial network control modules, and may incorporate a part of calculation of the industrial control modules in the PLC. The PLC may be integrated into the optical head end as a module (for example, a virtual programmable logic controller (vPLC) module) of the optical head end for implementation. Alternatively, the PLC may be integrated into another device separate from the optical head end. This is not limited herein.

In a possible implementation of the second aspect of embodiments of this application, after the PLC receives a notification message from the optical head end, the method further includes: The PLC sends first indication information to the optical head end, where the first indication information is used to request device capability information of the first slave station. The PLC receives the device capability information from the optical head end.

Based on the foregoing technical solution, after the PLC receives the notification message from the optical head end, that is, after the PLC determines that the first slave station goes online, the optical head end may further obtain device capability information of the first slave station through the optical communication connection with the optical terminal. After the optical head end obtains the device capability information of the first slave station, the optical head end may send the device capability information to the PLC, so that the PLC can implement another management operation on the first slave station based on the device capability information.

In a possible implementation of the second aspect of embodiments of this application, after the PLC receives the notification message from the optical head end, the method further includes: The PLC sends PDO configuration information of the first slave station to the optical head end.

Based on the foregoing technical solution, after the PLC receives the notification message from the optical head end, that is, after the PLC determines that the first slave station goes online, the PLC sends the PDO configuration information of the first slave station to the optical head end, so that the optical head end may determine the PDO configuration information of the first slave station and send the PDO configuration information to the optical terminal. Subsequently, the PLC and the first slave station may perform exchange of PDO data based on the PDO configuration information.

In a possible implementation of the second aspect of embodiments of this application, the PDO configuration information includes at least one of the following: a sending periodicity of PDO data, a memory access address of the PDO data, and mapping of a PDO data object.

Based on the foregoing technical solution, the PDO configuration information may specifically include a sending periodicity of PDO data, a memory access address of the PDO data, and mapping of a PDO data object, and/or other PDO configuration information, which provides a plurality of flexible implementations of the PDO configuration information.

In a possible implementation of the second aspect of embodiments of this application, the first correspondence is carried in an optical bus link layer message, and the optical bus link layer message includes at least one of the following: a destination MAC address, a source MAC address of the PLC, an Ethernet type, a protocol data unit PDU quantity, a timestamp, and a frame check sequence.

Optionally, the destination MAC address may indicate one or more MAC addresses of the optical head end.

Based on the foregoing technical solution, in the optical bus link used for communication between the PLC and the optical head end, a sent optical bus link layer message may carry at least one of the foregoing information, providing flexible implementations of the optical bus link layer message.

In a possible implementation of the second aspect of embodiments of this application, the first node identifier includes at least one of the following: a type identifier, a length value, a MAC address, and a node identifier.

Optionally, the MAC address may indicate a MAC address of the optical terminal or the first slave station.

Based on the foregoing technical solution, the first node identifier allocated by the optical head end to the first slave station based on the first correspondence may include at least one of the foregoing information, providing flexible implementations of the first node identifier.

In a possible implementation of the second aspect of embodiments of this application, device information includes at least one of the following: a type identifier, a length value, a node identifier, a vendor identifier of the optical terminal or the first slave station, a MAC address of the optical terminal or the first slave station, an OT model of the optical terminal or the first slave station, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

Based on the foregoing technical solution, the device information from the optical terminal that is received by the optical head end may include at least one of the foregoing information, and the first device identifier may include partial information of the foregoing device information, providing flexible implementations of the device information.

In a possible implementation of the second aspect of embodiments of this application, the method further includes: The PLC sends second indication information to the optical head end, where the second indication information indicates the first slave station to enter an emergency state.

Optionally, the second indication information indicates the first slave station to enter an emergency state, and may specifically indicate the first slave station to enter an emergency-stop state. In the emergency-stop state, the first slave station no longer periodically performs an action, and turns off or shuts down the action performed by the first slave station, to avoid damage to persons or machines.

Based on the foregoing technical solution, the PLC that manages the first slave station may send the second indication information to the optical head end to indicate the first slave station to enter the emergency state, so that the first slave station corresponding to the optical terminal connected to the optical head end enters a security protection state, to avoid damage to persons or machines.

In a possible implementation of the second aspect of embodiments of this application, after the PLC receives a notification message from the optical head end, the method further includes: The PLC sends third indication information to the optical head end, where the third indication information is used to request process data PDO of the first slave station. Then, the PLC receives the PDO from the optical head end.

Based on the foregoing technical solution, after the PLC receives the notification message from the optical head end, that is, after the PLC determines that the first slave station goes online, the PLC sends, to the optical head end, the third indication information used to request process data PDO of the first slave station, so that the optical head end can determine the PDO and send the PDO to the PLC, and the exchange of the PDO data is performed between the PLC and the first slave station.

In a possible implementation of the second aspect of embodiments of this application, before the PLC sends the third indication information to the optical head end, the method further includes: The PLC sends fourth indication information to the optical head end, where the fourth indication information indicates the first slave station to enter an operation state.

Optionally, that the first slave station enters the operation state may indicate the first slave station to start a field bus to work.

Based on the foregoing technical solution, after the PLC receives the notification message from the optical head end, that is, after the PLC determines that the first slave station goes online, the PLC may send, to the optical head end, fourth indication information indicating the first slave station to enter an operation state, and perform the exchange of the PDO data after the first slave station enters the operation state.

A third aspect of embodiments of this application provides a communication method. The method may be performed by an optical terminal, or may be performed by a component (for example, a processor, a chip, or a chip system) of the optical terminal. The method includes: The optical terminal sends a first message to the optical head end, where the first message includes a first device identifier, and the first device identifier indicates a first slave station connected to the optical terminal. Then, the optical terminal receives a first node identifier from the optical head end, where the first device identifier corresponds to the first node identifier.

Based on the foregoing technical solution, in a process in which the first slave station goes online, the optical terminal sends, through an optical fiber communication connection with the optical head end, a first message including the first device identifier to the optical terminal, so that the optical head end determines, from a first correspondence, the first node identifier corresponding to the first device identifier, where the first correspondence indicates a correspondence between a slave station device identifier and a slave station node identifier. Further, the optical terminal receives the first node identifier from the optical head end through the optical fiber communication connection with the optical head end. The first slave station is configured to go online through optical fiber communication between the optical head end and the optical terminal end. That is, management for a slave station is implemented through optical fiber communication. Compared with a conventional communication manner of using a twisted pair connection in a field bus network, this can greatly reduce a transmission delay, and improve communication efficiency.

In a possible implementation of the third aspect of embodiments of this application, after the optical terminal receives a first node identifier from the optical head end, the method further includes: The optical terminal receives first indication information from the optical head end, where the first indication information is used to request device capability information of the first slave station. Then, the optical terminal determines the device capability information based on the first indication information. Then, the optical terminal sends the device capability information to the optical head end.

Based on the foregoing technical solution, after the optical terminal receives the first node identifier from the optical head end, that is, after the optical terminal determines that the first slave station goes online, the optical terminal may further obtain the first indication information through an optical communication connection with the optical head end, and send the device capability information of the first slave station to the optical head end based on the first indication information, so that the optical head end can subsequently implement another management operation on the first slave station based on the device capability information of the first slave station, for example, exchange of PDO configuration information and exchange of PDO data.

In a possible implementation of the third aspect of embodiments of this application, after the optical terminal receives the first node identifier from the optical head end, the method further includes: The optical terminal receives PDO configuration information of the first slave station from the optical head end. Then, the optical terminal sends the PDO configuration information to the first slave station.

Based on the foregoing technical solution, after the optical terminal receives the first node identifier from the optical head end, that is, after the optical terminal determines that the first slave station goes online, the optical terminal may further receive the PDO configuration information from the optical head end, and send the PDO configuration information to the first slave station, so that the exchange of the PDO data can be subsequently implemented based on the PDO configuration information.

In a possible implementation of the third aspect of embodiments of this application, the first node identifier is carried in an optical network terminal management and control interface OMCI message, and the OMCI message further includes a gigabit passive optical network encapsulation mode port identifier GEMport ID. Alternatively, the first node identifier is carried in an operation, administration, and maintenance OAM message, and the OAM message further includes a logical link identifier LLID.

Based on the foregoing technical solution, the optical head end and the optical terminal may be implemented in a plurality of communication manners. When the communication manner is a gigabit PON (GPON) in a passive optical network (PON), the first node identifier sent by the optical head end to the optical terminal may be carried in the optical network terminal management and control interface (OMCI) message, where the OMCI message carries a port identifier (GPON/10G GPON/50G GPON encapsulation mode/ method port identifier, GEMport ID) of a gigabit passive optical network encapsulation mode. When the communication manner is an Ethernet PON (ethernet passive optical network, EPON), a 10 gigabit Ethernet PON (10G ethernet passive optical network, 10G-EPON), the first node identifier sent by the optical head end to the optical terminal may be carried in the optical network terminal management and control interface (OAM) message, where the OAM message carries a logical link identifier (LLID).

In a possible implementation of the third aspect of embodiments of this application, the first node identifier includes at least one of the following: a type identifier, a length value, a MAC address, and a node identifier.

Optionally, the MAC address may indicate a MAC address of the optical terminal or the first slave station.

Based on the foregoing technical solution, the first node identifier allocated by the optical head end to the first slave station based on the first correspondence may include at least one of the foregoing information, providing flexible implementations of the first node identifier.

In a possible implementation of the third aspect of embodiments of this application, the first device identifier includes at least one of the following: a type identifier, a length value, a node identifier, a vendor identifier of the optical terminal or the first slave station, a MAC address of the optical terminal or the first slave station, an OT model of the optical terminal or the first slave station, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

Based on the foregoing technical solution, the device information from the optical terminal that is received by the optical head end may include at least one of the foregoing information, and the first device identifier may include partial information of the foregoing device information, providing flexible implementations of the device information.

In a possible implementation of the third aspect of embodiments of this application, the method further includes: The optical terminal receives second indication information from the optical head end, where the second indication information indicates the first slave station to enter an emergency state. Then, the optical terminal sends the second indication information to the first slave station.

Optionally, the second indication information indicates the first slave station to enter an emergency state, and may specifically indicate the first slave station to enter an emergency-stop state. In the emergency-stop state, the first slave station no longer periodically performs an action, and turns off or shuts down the action performed by the first slave station, to avoid damage to persons or machines.

Based on the foregoing technical solution, the optical head end that manages the first slave station may send, to the optical terminal, the second indication information indicating the first slave station to enter the emergency state. Then, the optical terminal sends the second indication information to the first slave station, so that the first slave station enters a security protection state, to avoid damage to persons or machines.

In a possible implementation of the third aspect of embodiments of this application, after the optical terminal receives the first node identifier from the optical head end, the method further includes: The optical terminal receives third indication information from the optical head end, where the third indication information is used to request process data PDO corresponding to the node identifier of the first slave station. Then, the optical terminal determines the PDO based on the third indication information. Then, the optical terminal sends the PDO to the optical head end.

Based on the foregoing technical solution, after the optical terminal receives the first node identifier from the optical head end, that is, after the optical terminal determines that the first slave station goes online, the optical terminal may further receive, from the optical head end, the third indication information used to request the process data PDO corresponding to the node identifier of the first slave station, and send the PDO to the optical head end based on the third indication information, to implement the exchange of the PDO data.

In a possible implementation of the third aspect of embodiments of this application, before the optical terminal receives the third indication information from the optical head end, the method further includes: The optical terminal receives fourth indication information from the optical head end, where the fourth indication information indicates the first slave station corresponding to the node identifier of the first slave station to enter an operation state. Then, the optical terminal sends the fourth indication information to the first slave station.

Optionally, that the first slave station enters the operation state may indicate the first slave station to start a field bus to work.

Based on the foregoing technical solution, after the optical terminal receives the first node identifier from the optical head end, that is, after the optical terminal determines that the first slave station goes online, the optical terminal may receive the fourth indication information that is sent by the optical head end and that indicates the first slave station to enter the operation state, and perform the exchange of the PDO data based on the third indication information after the first slave station enters the operation state.

A fourth aspect of embodiments of this application provides an optical head end, including a processing unit and a transceiver unit.

The processing unit is configured to determine a first correspondence, where the first correspondence indicates a correspondence between a slave station device identifier and a slave station node identifier.

The transceiver unit is configured to receive a first message from an optical terminal, where the first message includes device information, the device information includes a first device identifier, and the first device identifier indicates a first slave station connected to the optical terminal.

The processing unit is further configured to determine, from the first correspondence, a first node identifier corresponding to the first device identifier.

The transceiver unit is further configured to send the first node identifier to the optical terminal.

In a possible implementation of the fourth aspect of embodiments of this application, the processing unit is specifically configured to receive the first correspondence from a programmable logic controller PLC using the transceiver unit.

In a possible implementation of the fourth aspect of embodiments of this application, the transceiver unit is further configured to send a notification message to the PLC, where the notification message indicates the first slave station to go online, and the notification message includes the first node identifier.

In a possible implementation of the fourth aspect of embodiments of this application, the transceiver unit is further configured to send first indication information to the optical terminal, where the first indication information is used to request the device capability information of the first slave station.

The transceiver unit is further configured to receive the device capability information from the optical terminal.

In a possible implementation of the fourth aspect of embodiments of this application, the transceiver unit is further configured to send the device capability information to the PLC.

In a possible implementation of the fourth aspect of embodiments of this application, the transceiver unit is further configured to receive the first indication information from the PLC.

In a possible implementation of the fourth aspect of embodiments of this application, the processing unit is further configured to determine PDO configuration information of the first slave station.

The transceiver unit is further configured to send the PDO configuration information to the optical terminal.

In a possible implementation of the fourth aspect of embodiments of this application, the PDO configuration information includes at least one of the following: a sending periodicity of PDO data, a memory access address of the PDO data, and mapping of a PDO data object.

In a possible implementation of the fourth aspect of embodiments of this application, the processing unit is specifically configured to receive the PDO configuration information of the first slave station from the PLC using the transceiver unit.

In a possible implementation of the fourth aspect of embodiments of this application, the processing unit is further configured to determine a second correspondence, where the second correspondence indicates a correspondence between the optical terminal and at least one slave station connected to the optical terminal, and the at least one slave station includes the first slave station.

In a possible implementation of the fourth aspect of embodiments of this application, the first node identifier is carried in an optical network terminal management and control interface OMCI message, and the OMCI message further includes a gigabit passive optical network encapsulation mode port identifier GEMport ID; or the first node identifier is carried in an operation, administration, and maintenance OAM message, and the OAM message further includes a logical link identifier LLID.

In a possible implementation of the fourth aspect of embodiments of this application, the first correspondence is carried in an optical bus link layer message, and the optical bus link layer message includes at least one of the following: a destination MAC address, a media access control MAC address of the PLC, an Ethernet type, a protocol data unit PDU quantity, a timestamp, and a frame check sequence.

In a possible implementation of the fourth aspect of embodiments of this application, the first node identifier includes at least one of the following: a type identifier, a length value, a MAC address, and a node identifier.

In a possible implementation of the fourth aspect of embodiments of this application, device information includes at least one of the following: a type identifier, a length value, a node identifier, a vendor identifier of the optical terminal or the first slave station, a MAC address of the optical terminal or the first slave station, an OT model of the optical terminal, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

In a possible implementation of the fourth aspect of embodiments of this application, the transceiver unit is further configured to send second indication information to the optical terminal, where the second indication information indicates the first slave station to enter an emergency state.

In a possible implementation of the fourth aspect of embodiments of this application, the transceiver unit is further configured for the optical terminal to send third indication information, where the third indication information is used to request process data PDO of the first slave station.

The optical head end receives the PDO from the optical terminal.

In a possible implementation of the fourth aspect of embodiments of this application, the transceiver unit is further configured to send the PDO to the PLC.

In a possible implementation of the fourth aspect of embodiments of this application, the transceiver unit is further configured to receive the third indication information from the PLC.

In a possible implementation of the fourth aspect of embodiments of this application, the transceiver unit is further configured to send fourth indication information to the optical terminal, where the fourth indication information indicates the first slave station to enter an operation state.

In the fourth aspect of embodiments of this application, composition modules of a communication apparatus may be further configured to perform the steps performed in the possible implementations of the first aspect. For details, refer to the first aspect. Details are not described herein again.

A fifth aspect of embodiments of this application provides a programmable logic controller PLC, including a processing unit and a transceiver unit.

The processing unit is configured to determine a first correspondence, where the first correspondence indicates a correspondence between a slave station device identifier and a slave station node identifier, the correspondence indicates that at least a first device identifier corresponds a first node identifier, and the first device identifier indicates a first slave station connected to an optical terminal.

The transceiver unit is configured to send the first correspondence to an optical head end.

The transceiver unit is further configured to receive a notification message from the optical head end, where the notification message indicates the first slave station to go online, and the notification message includes the first node identifier.

In a possible implementation of the fifth aspect of embodiments of this application, the transceiver unit is further configured to send first indication information to the optical head end, where the first indication information is used to request the device capability information of the first slave station.

The PLC receives the device capability information from the optical head end.

In a possible implementation of the fifth aspect of embodiments of this application, the transceiver unit is further configured to send the PDO configuration information of the first slave station to the optical head end.

In a possible implementation of the fifth aspect of embodiments of this application, the PDO configuration information includes at least one of the following: a sending periodicity of PDO data, a memory access address of the PDO data, and mapping of a PDO data object.

In a possible implementation of the fifth aspect of embodiments of this application, the first correspondence is carried in an optical bus link layer message, and the optical bus link layer message includes at least one of the following: a destination MAC address, a source MAC address of the PLC, an Ethernet type, a protocol data unit PDU quantity, a timestamp, and a frame check sequence.

In a possible implementation of the fifth aspect of embodiments of this application, the first node identifier includes at least one of the following: a type identifier, a length value, a MAC address, and a node identifier.

In a possible implementation of the fifth aspect of embodiments of this application, device information includes at least one of the following: a type identifier, a length value, a node identifier, a vendor identifier of the optical terminal or the first slave station, a MAC address of the optical terminal or the first slave station, an OT model of the optical terminal or the first slave station, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

In a possible implementation of the fifth aspect of embodiments of this application, the transceiver unit is further configured to send second indication information to the optical head end, where the second indication information indicates the first slave station to enter an emergency state.

In a possible implementation of the fifth aspect of embodiments of this application, the transceiver unit is further configured to send third indication information to the optical head end, where the third indication information is used to request process data PDO of the first slave station.

The transceiver unit is further configured to receive the PDO from the optical head end.

In a possible implementation of the fifth aspect of embodiments of this application, the transceiver unit is further configured to send fourth indication information to the optical head end, where the fourth indication information indicates the first slave station to enter an operation state.

In the fifth aspect of embodiments of this application, composition modules of a communication apparatus may be further configured to perform the steps performed in the possible implementations of the second aspect. For details, refer to the second aspect. Details are not described herein again.

A sixth aspect of embodiments of this application provides an optical terminal, including a processing unit and a transceiver unit.

The processing unit is configured to determine a first device identifier, where the first device identifier indicates a first slave station connected to the optical terminal.

The transceiver unit is configured to send a first message to an optical head end, where the first message includes the first device identifier.

The transceiver unit is further configured to receive a first node identifier from the optical head end, where the first device identifier corresponds to the first node identifier.

In a possible implementation of the sixth aspect of embodiments of this application, the transceiver unit is further configured to receive first indication information from the optical head end, where the first indication information is used to request device capability information of the first slave station.

The processing unit is further configured to determine the device capability information based on the first indication information.

The transceiver unit is further configured to send the device capability information to the optical head end.

In a possible implementation of the sixth aspect of embodiments of this application, the transceiver unit is further configured to receive PDO configuration information of the first slave station from the optical head end.

The transceiver unit is further configured to send the PDO configuration information to the first slave station.

In a possible implementation of the sixth aspect of embodiments of this application, the first node identifier is carried in an optical network terminal management and control interface OMCI message, and the OMCI message further includes a gigabit passive optical network encapsulation mode port identifier GEMport ID.

The first node identifier is carried in an operation, administration, and maintenance OAM message, and the OAM message further includes a logical link identifier LLID.

In a possible implementation of the sixth aspect of embodiments of this application, the first node identifier includes at least one of the following: a type identifier, a length value, a MAC address, and a node identifier.

In a possible implementation of the sixth aspect of embodiments of this application, the first device identifier includes at least one of the following: a type identifier, a length value, a node identifier, a vendor identifier of the optical terminal or the first slave station, a MAC address of the optical terminal or the first slave station, an OT model of the optical terminal or the first slave station, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

In a possible implementation of the sixth aspect of embodiments of this application, the transceiver unit is further configured to receive second indication information from the optical head end, where the second indication information indicates the first slave station to enter an emergency state.

The transceiver unit is further configured to send the second indication information to the first slave station.

In a possible implementation of the sixth aspect of embodiments of this application, the transceiver unit is further configured to receive third indication information from the optical head end, where the third indication information is used to request process data PDO corresponding to the node identifier of the first slave station.

The processing unit is further configured to determine the PDO based on the third indication information.

The transceiver unit is further configured to send the PDO to the optical head end.

In a possible implementation of the sixth aspect of embodiments of this application, the transceiver unit is further configured to receive fourth indication information from the optical head end, where the fourth indication information indicates the first slave station corresponding to the node identifier of the first slave station to enter an operation state.

The transceiver unit is further configured to send the fourth indication information to the first slave station.

In the sixth aspect of embodiments of this application, composition modules of a communication apparatus may be further configured to perform the steps performed in the possible implementations of the third aspect. For details, refer to the third aspect. Details are not described herein again.

A seventh aspect of embodiments of this application provides an optical head end, including an optical transceiver and a processor coupled to the optical transceiver, where the processor is configured to perform some or all steps of any method performed by the optical head end in embodiments of this application.

An eighth aspect of embodiments of this application provides a PLC, including an optical transceiver and a processor coupled to the optical transceiver, where the processor is configured to perform some or all steps of any method performed by the PLC in embodiments of this application.

A ninth aspect of embodiments of this application provides an optical line terminal, including an optical transceiver and a processor coupled to the optical transceiver, where the processor is configured to perform some or all steps of any method performed by the optical line terminal in embodiments of this application.

A tenth aspect of embodiments of this application provides a communication system. The communication system includes the optical head end in any one of the fourth aspect or the seventh aspect and the implementations thereof, and the PLC in any one of the fifth aspect or the eighth aspect and embodiments thereof.

Optionally, the communication system further includes the optical terminal according to any one of the sixth aspect or the ninth aspect and embodiments thereof.

An eleventh aspect of embodiments of this application provides a computer-readable storage medium, where the computer-readable storage medium stores a computer program, and when the computer program is executed by hardware, some or all steps of any method performed by the optical head end in embodiments of this application can be implemented.

A twelfth aspect of embodiments of this application provides a computer-readable storage medium, where the computer-readable storage medium stores a computer program, and when the computer program is executed by hardware, some or all steps of any method performed by the PLC in embodiments of this application can be implemented.

A thirteenth aspect of embodiments of this application provides a computer-readable storage medium, where the computer-readable storage medium stores a computer program, and when the computer program is executed by hardware, some or all steps of any method performed by the optical terminal in embodiments of this application can be implemented.

A fourteenth aspect of embodiments of this application provides a computer program product including instructions. When the computer program product runs on an optical network unit, the optical network unit is enabled to perform some or all steps of the methods performed by the optical head end in the foregoing aspects.

A fifteenth aspect of embodiments of this application provides a computer program product including an instruction. When the computer program product runs on an optical line terminal, the optical line terminal is enabled to perform some or all steps of the methods performed by the PLC in the foregoing aspects.

A sixteenth aspect of embodiments of this application provides a computer program product including instructions. When the computer program product runs on an optical line terminal, the optical line terminal is enabled to perform some or all steps of the methods performed by the optical terminal in the foregoing aspects.

DETAILED DESCRIPTION OF ILLUSTRATIVE EMBODIMENTS

The following describes the technical solutions in embodiments of the present invention with reference to the accompanying drawings in embodiments of the present invention. It is clear that the described embodiments are merely some rather than all of embodiments of the present invention. All other embodiments obtained by a person of ordinary skill in the art based on embodiments of the present invention without creative efforts shall fall within the protection scope of the present invention.

The industrial Internet is a core component of Industry 4.0. In a broad sense, the industrial Internet is an industrial Internet that covers manufacturing, energy, electricity, water, transportation, health care, aviation and many other industries. In a narrow sense, the industrial Internet focuses on industrial manufacturing.

Conventional industrial manufacturing networks are divided into three levels of networks: Ethernet Internet, control network, and field bus (Device Level Network).

Figure 1:
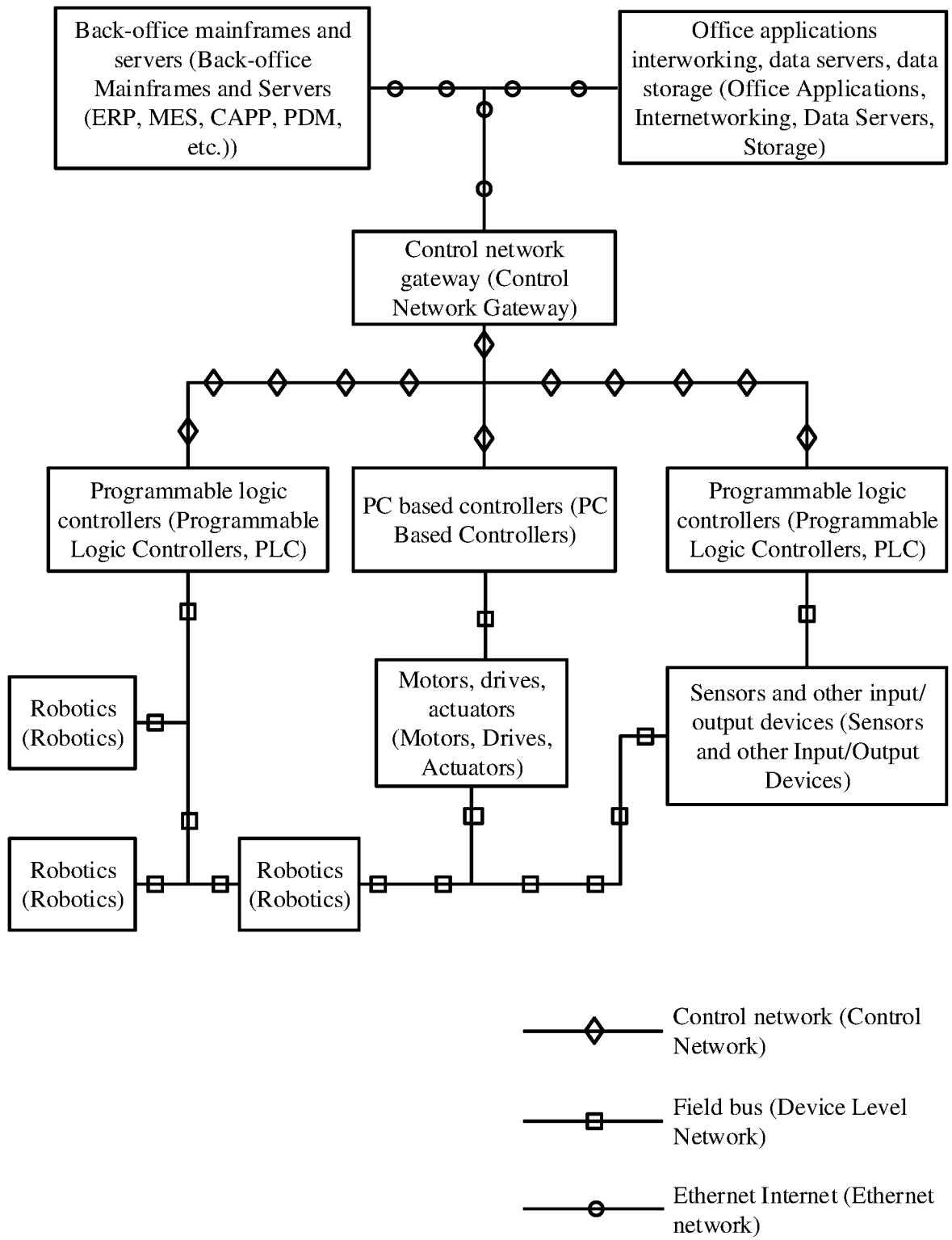
FIG. 1 is a schematic diagram of implementation of a field bus network.

For example, the Ethernet Internet uses conventional technologies for data communication between factory networks. As shown in connections represented by line segments with circles in FIG. 1, the Ethernet Internet may be applied to connections between back-office mainframes and servers (BackERP, MES, CAPP, PDM, etc.), office application, interworking, data servers, data storage (Office Applications, Internetworking, Data Servers, Storage), and a control network gateway, for example, a corporate network.

The control network is used for workshop-level communication between a plurality of bus controllers. As shown in connections represented by line segments with diamonds in FIG. 1, the Ethernet Internet may be applied to connections between the control network gateway, PC based controllers, and programmable logic controllers (PLCs), and other devices.

The field bus is a basic network of devices, and may specifically indicate a bidirectional multi-node digital communication technology applied to production sites and implemented between field devices and between field devices and control apparatuses. As shown in connections represented by line segments with rectangles in FIG. 1, the field bus may be applied to connections between motors, drivers, actuators, robotics, sensors and other input/output devices, and the like.

The conventional industrial manufacturing network has the following disadvantages: The three levels of networks have different standards and therefore cannot implement mutual interconnectivity. Machine data cannot be viewed on the upper-layer network, and consequently value of the machine data cannot be maximized and intelligent production cannot be implemented. In addition, a millisecond-level operation periodicity of the industrial bus cannot meet a lower-latency requirement, namely, a microsecond (μs) level, in future industrial manufacturing; 100-megabyte bandwidth of the industrial bus also hardly meets a large-bandwidth requirement such as machine vision.

The following describes implementations of a common network architecture constructed based on the foregoing three levels of network.

Implementation 1

Ethernet control automation technology (EtherCAT) is an Ethernet-based field bus system with an open architecture. The EtherCAT sets up new criteria for real-time system performance and topology flexibility, and also meets and even reduces costs of using the field bus. The EtherCAT also features high-precision device synchronization, optional cable redundancy, and functional security protocols.

An operation principle of the EtherCAT is as follows.

1. The EtherCAT uses standard Ethernet data frames and a physical layer that complies with the Ethernet standard IEEE 802.3. However, it is incompatible with standard Ethernet devices and requires dedicated chips.

2. An EtherCAT master station sends a packet that passes through all nodes. The operation mechanism on the fly ensures efficient data transmission. During transmission of a data frame on the network, each node reads addressed data of the node in the frame and writes data to be exchanged into the frame.

3. In slave stations, receiving and decoding of data frames, extraction and insertion of data, and forwarding of data frames are implemented by hardware. Therefore, time for the EtherCAT data frames to pass through each slave station is very short, with a delay of about 100 to 500 nanoseconds (ns).

4. When the last node on a network segment or branch detects an open port (with no next slave station), the last node returns the packet to a master station by virtue of a full-duplex feature of the Ethernet technology.

5. The EtherCAT master station is the only node that can actively send EtherCAT data frames in the network segment, and other nodes only transfer data frames. This avoids unpredictable delay and ensures the real-time performance of the EtherCAT.

6. The EtherCAT involves a plurality of application-layer protocols, including COE (CANopen over EtherCAT), SOE (Sercos over EtherCAT) and EOE (EtherNet over EtherCAT) and supporting TCP/IP and FOE (File Access over EtherCAT).

Specifically, the EtherCAT standardizes states and operation functions of a site. A brief introduction to the state and functions is described as follows.

Init: indicates an initialization state. In this state, the site checks whether the data link is correct and does not exchange data with an application layer.

Pre-Op: indicates a pre-operation state (POP). In this state, the site only performs mailbox communication but does not perform process data exchange.

Safe-Op: indicates a safe operation state (SOP). In this state, the site may perform mailbox communication and allow process data input but not output.

OP: indicates an operation state. The site can perform complete data communication and is in a normal working state.

Bootstrap: a boot mode, which is applicable only to FoE mailbox communication and is used for firmware update.

Implementation 2

POWERLINK is a real-time communication technology developed and put into use in the year 2001. The physical layer and data link layer of POWERLINK are based on Ethernet, and the application layer of POWERLINK uses CANopen. POWERLINK uses technologies such as polling, multiplexing, poll request chain, and the like to continuously improve communication efficiency of POWERLINK.

A basic operation principle of POWERLINK is as follows. POWERLINK is implemented on a common Ethernet without using an ASIC chip. Users can implement POWERLINK on various platforms, such as FPGA, ARM, and x86. POWERLINK uses a time slot communication network management mechanism (SCNM) to avoid possible data collision during communication. Only data frames are transmitted. This avoids unpredictable delays and ensures real-time performance of POWERLINK.

1. Start: When a POWERLINK device is started, subsequent behavior of the node is based on a node number. If the node number is 1 to 239, it indicates that the node is a slave station. In this case, the node enters a state machine of the slave station. If the node number is 240 and the 14th bit of NMT_StartUp_U32 object (index 1F80h) is 0, the node is a standard master station. If the 14th bit of NMT- _StartUp_U32 object (index 1F80h) is 1, the node is a redundant master station and enters a state machine of the redundant master station.

2. State machine of the redundant master station: The state machine of the redundant master station has two major states: an active state and a standby state. When the node is in the active state, the node works as an active master station. When the node is in the standby state, the node is in a standby master station. When the node is started and enters the state machine of the redundant master station, the node checks whether SOC and SOA data frames can be received within a specified time. If the SOC and SOA data frames can be received, it indicates that there is an active master station on the network and the node enters the standby state. Otherwise, the node enters the active state.

2.1. Active state: When the node works in the active state of the redundant master station, the node functions the same as that of the standard master station. In addition, a function of switching to the standby state is added. Upon reception of SOC, SOA, and AMNI messages, the node switches from the active state to the standby state.

2.2. Standby state: When the node works in the standby state of the redundant master station, from the perspective of the active master station, the standby master station works like the standard slave station, receives PollReq data frames from the active master station, and replies the PollRes data frames. In addition, the standby master station provides the following functions.

(1) Periodically detect SOA and SOC data frames. If no SOA and SOC are received within a specified time, the state needs to switch a state to take over the work of the active master station.

(2) Monitor a state of another node on the network. The standby master station obtains state information by listening to information about data frames such as PollResponse, StatusResponse, and IdentResponse of the node and updates the information into a list of the standby master station. The information is needed to achieve seamless switching when the standby master station takes over the work of the active master station.

In the foregoing several implementations, due to hardware characteristics of twisted pairs, an operation periodicity of a current field bus network is at a milliseconds (ms) level, which cannot meet a higher-level low-latency requirement of future industrial manufacturing. Therefore, how to manage a slave station through communication with a lower delay in a field bus network is a technical problem to be urgently resolved. Further, the current field bus network further includes other points to be improved, for example, a quantity of supported nodes is small, a twisted pair network cable is vulnerable to electromagnetic radiation and causes a bit error, common service bearing (such as an industrial camera) is not supported.

Therefore, embodiments of this application provide a communication method and a related device, to implement management for a slave station through optical fiber communication. Compared with a conventional communication manner of using a twisted pair connection in a field bus network, this can greatly reduce a transmission delay, and improve communication efficiency.

The following first describes a network architecture to which embodiments of this application are applied.

Figure 2:
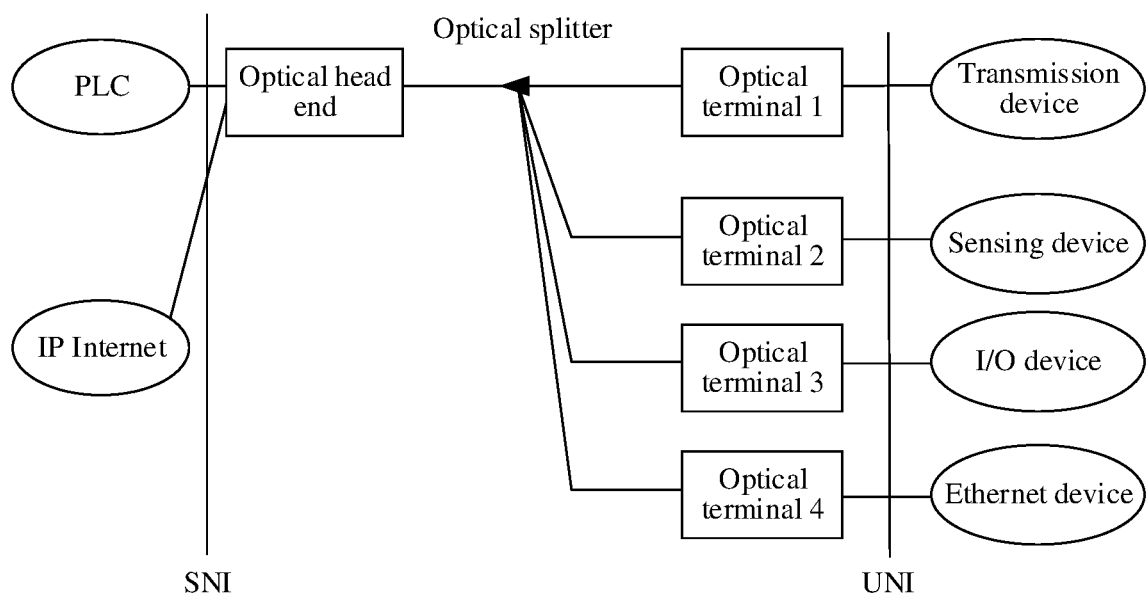
FIG. 2 is a schematic diagram of a communication system according to an embodiment of this application.

FIG. 2 is a schematic diagram of a network architecture according to an embodiment of this application.

In FIG. 2, a PLC, serving as a master station, is configured to manage slave stations (a transmission device, a sensing device, an I/O device, an Ethernet device, and the like) using transmission media including an optical head end and an optical terminal.

A possible network architecture of a bus system shown in FIG. 2 provides a capability of "one network to the end". In the optical bus network, both conventional industrial devices including a transmission device, a sensing device, an I/O device, and the like and Ethernet/IP Internet devices can be accessed. Specifically, an interface between the PLC and the optical head end may be referred to as a service node interface (SNI), where the PLC and the optical head end may be connected through IP Internet. An interface between the optical terminal and a slave station connected to the optical terminal may be referred to as a user network interface (UNI).

Figure 3A:
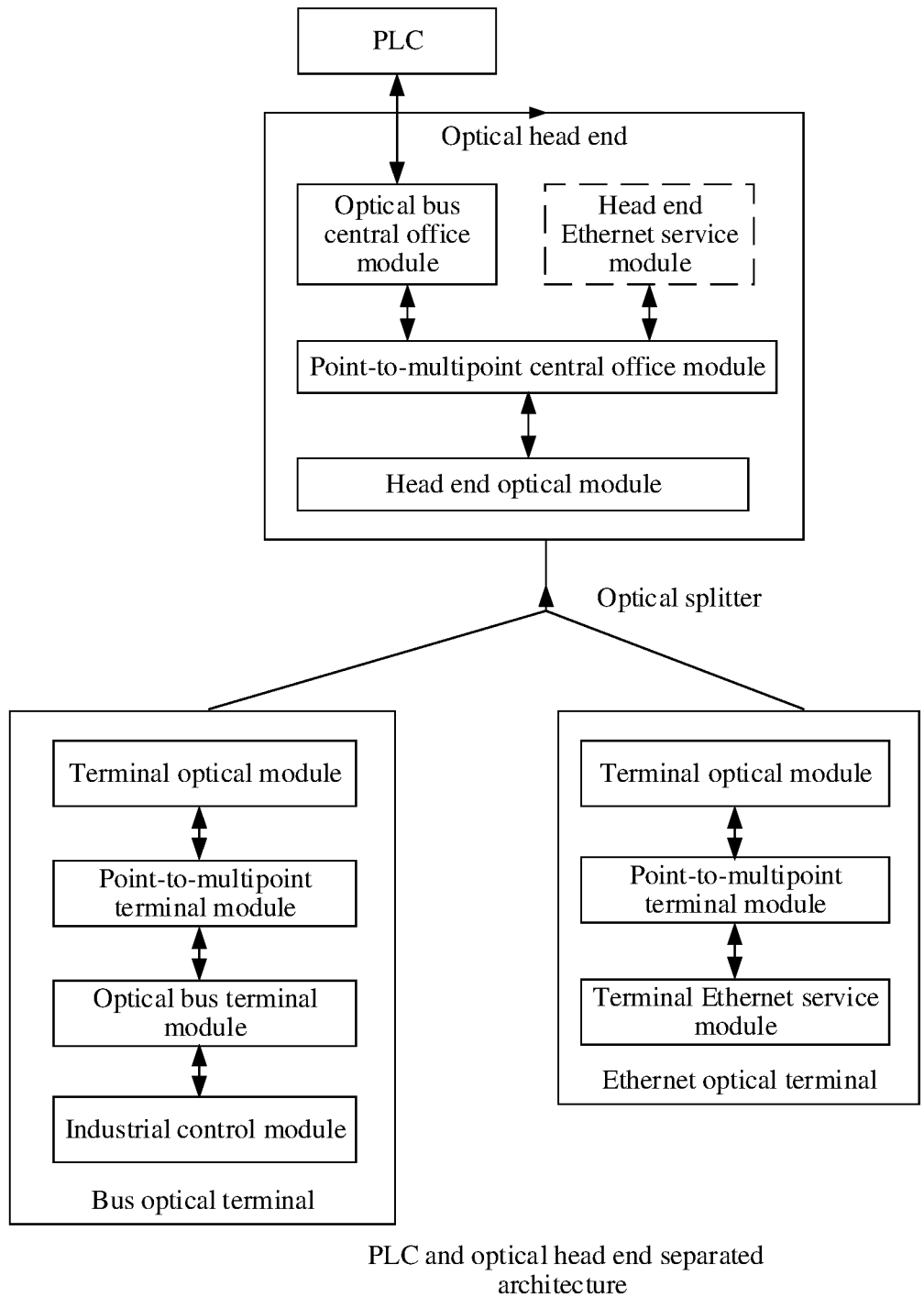
FIG. 3a is another schematic diagram of a communication system according to an embodiment of this application.
Figure 3B:
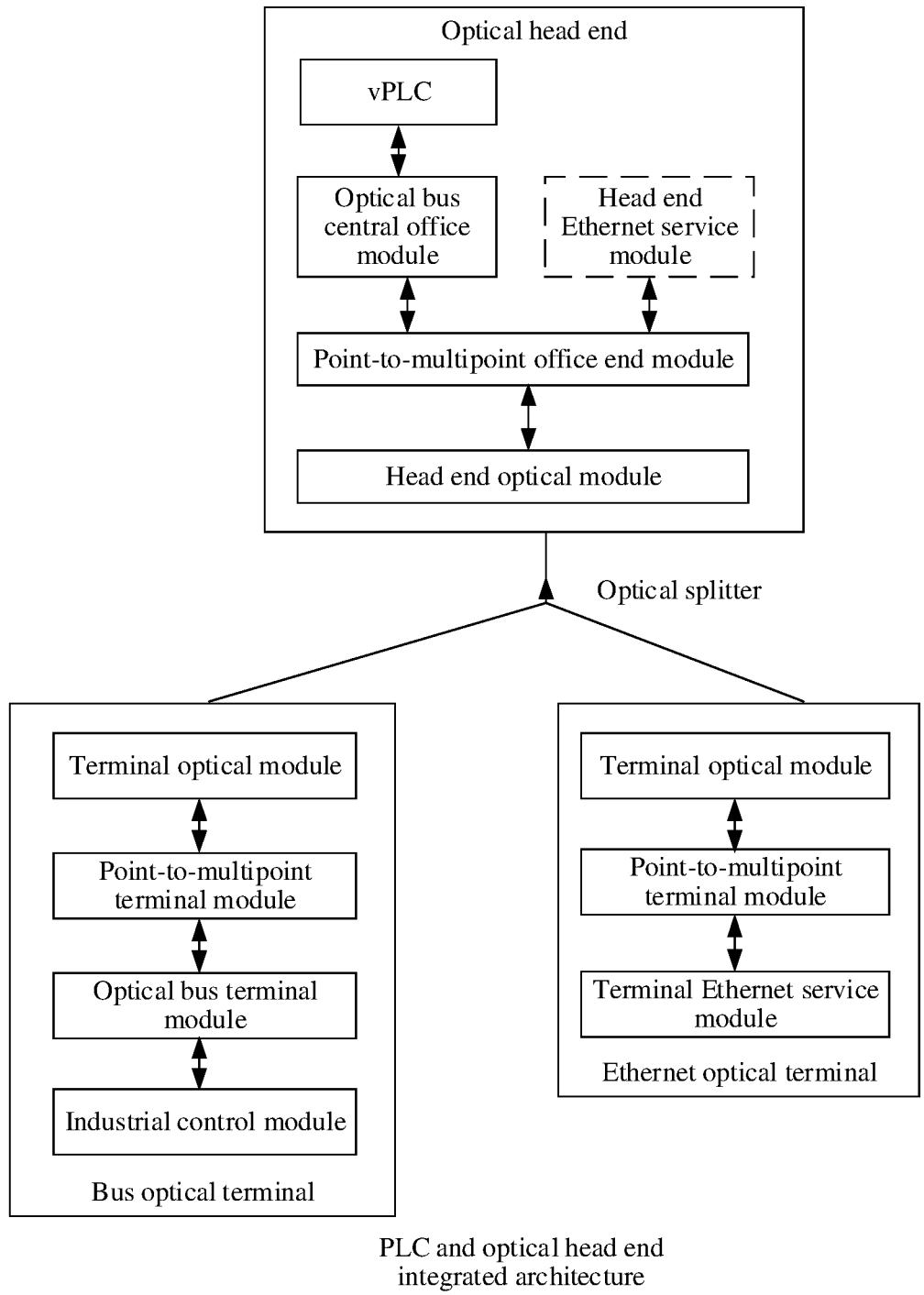
FIG. 3b is another schematic diagram of a communication system according to an embodiment of this application.

Further, in the network architecture shown in FIG. 2, the PLC and the optical head end may be combined and integrated together, as shown in FIG. 3b; or may be designed separately, as shown in FIG. 3a. In a network structure, if the PLC and the optical head end system are connected through a separate external interface, the SNI of the optical bus system may be an Ethernet interface (FE, GE, or 10GE) or a PCIE interface. If the optical head end and a vPLC are deployed in an integrated system, an interface between the optical head end and the vPLC is an internal software transceiver interface. The UNI interface is one or more of the Ethernet interface (FE, GE, or 10GE), a SPI interface, and a servo motor monitoring and driving interface (AD, GPIO, RS422, or PWM control).

As shown in the network system architectures in FIG. 3a and FIG. 3b, a complete optical bus system may generally include the following parts.

1. Optical head end: mainly carries and multiplexes bus services and Ethernet services in a point-to-multipoint communication system.

2. PLC (vPLC) module: implements programming and management of a plurality of industrial network control modules, and incorporates a part of calculation of the industrial control module in the PLC module.

It should be noted that, the PLC may manage the slave station through programming and management of the plurality of industrial network control modules, and may incorporate a part of calculation of the industrial control modules in the PLC. The PLC may be integrated into the optical head end as a module (for example, a virtual programmable logic controller (vPLC) module) of the optical head end for implementation. Alternatively, the PLC may be integrated into another device separate from the optical head end. This is not limited herein. In addition, the PLC may be replaced with any controller module that has an extremely high requirement on real-time performance. For example, the PLC may be a separate device, or may be a module in a server that includes a general-purpose CPU.

3. Optical bus central office module: carries optical bus services. Service data is data of a control machine or a query/collection machine.

4. (Optional) Central office Ethernet service module: carries central office Ethernet services, where an interface exhibited by the device is an Ethernet interface, such as FE, GE, and 10GE.

5. Point-to-multipoint central office module: implements link layer communication between a plurality of optical terminals in a point-to-multipoint network. The module may be a central office module in PON communication, and a PON standard may be GPON, EPON, 10G GPON, 10G EPON, 50G GPON, CDMA PON, FDM PON, or the like.

6. Head end optical module: transmits optical signals at the optical head end and receives optical terminal signals. The optical signal herein may be a single wavelength signal or multi-wavelength signal.

7. Optical splitter: The optical splitter performs functions of point-to-multipoint optical splitting/combining. The optical splitter herein may be a one-level or multi-level optical splitter, and the optical splitter may be an optical fiber with an equal ratio or an optical fiber with an unequal ratio.

8. Optical terminal: A single optical terminal obtains industrial control information or Ethernet information in a point-to-multipoint system. According to service types, optical terminals can be classified into an optical terminal sharing a bus and an optical terminal not sharing a bus.

9. Terminal optical module: receives optical signals from the optical head end and transmits optical terminal signals.

10. Point-to-multipoint terminal module: implements link layer communication between a plurality of optical terminals in a point-to-multipoint network. The module may be a terminal module in PON communication, and the PON standard may be GPON, EPON, 10G GPON, 10G EPON, 50G PON, CDMA PON, FDM PON, or the like.

11. Optical bus terminal module: parses optical bus data and performs read and/or write operations on the industrial control module.

12. Industrial control module: a module that controls an industrial device/I/O, where the industrial device may be a sensor, a server, an I/O device, or the like.

13. (Optional) Terminal Ethernet service module: carries Ethernet services of terminals, where an interface exhibited by the device is an Ethernet interface, such as FE, GE, and 10GE.

In the network architectures shown in FIG. 2, FIG. 3a, and FIG. 3b, the optical head end and the optical splitter and the optical splitter and the optical terminal are connected through optical fibers. The optical fibers herein may be common optical fibers, or may be optical-electrical integrated optical fiber, and may supply power to the optical terminal.

Figure 4:
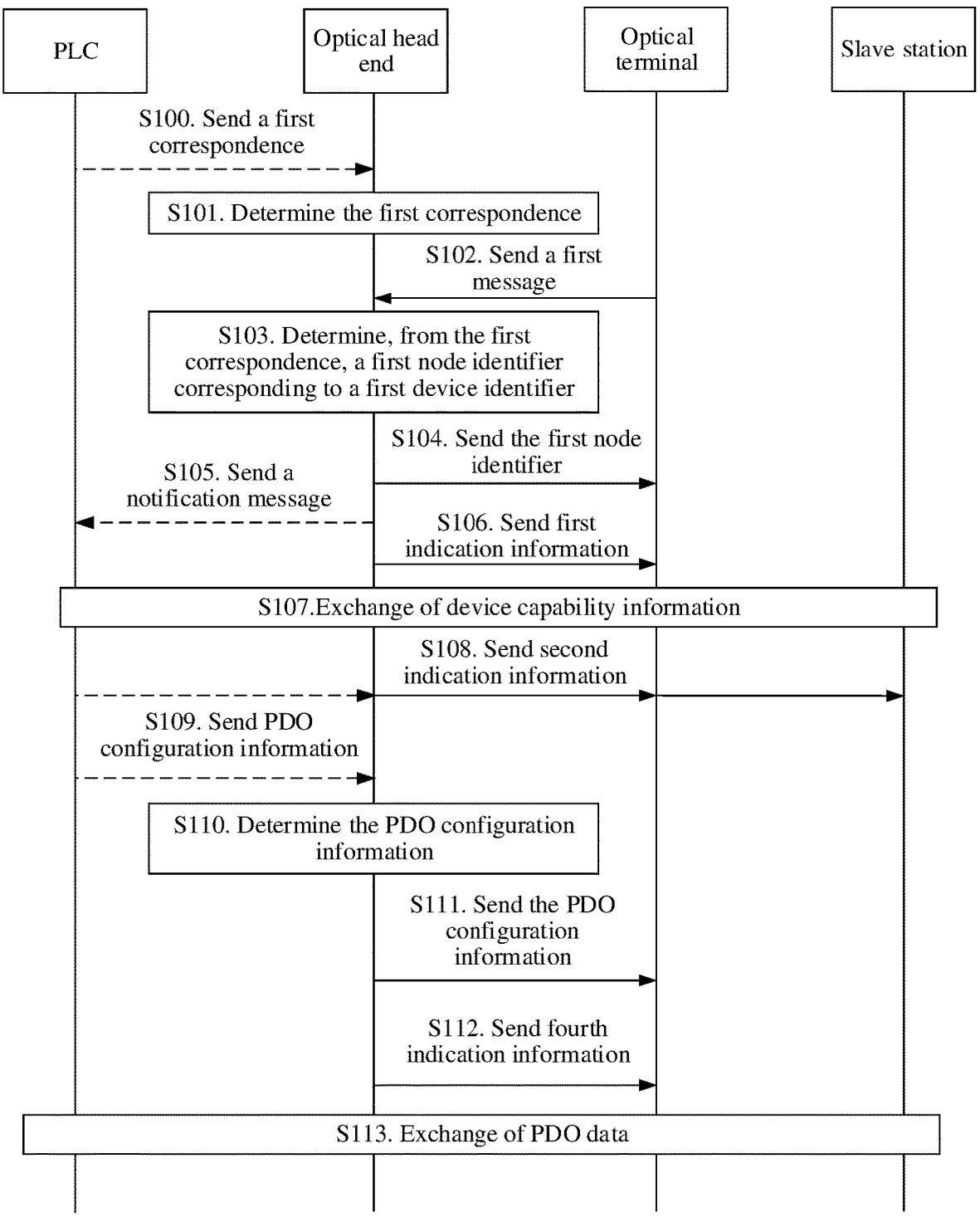
FIG. 4 is a schematic diagram of a communication method according to an embodiment of this application.

FIG. 4 is a schematic diagram of a communication method according to an embodiment of this application. The method includes the following steps. The method shown in FIG. 4 may be applied to the network architectures shown in FIG. 2, FIG. 3a, and FIG. 3b.

S100. The PLC sends a first correspondence to the optical head end.

In this embodiment, the PLC sends the first correspondence to the optical head end in step S100, and the first correspondence indicates a correspondence between a slave station device identifier and a slave station node identifier. Correspondingly, the optical head end receives the first correspondence from the PLC in step S100.

As shown in FIG. 2, FIG. 3a, and FIG. 3b, the PLC and the optical head end may be combined and integrated together, or may be designed separately and independently. Step S100 is an optional step. In the case that the PLC and the optical head end are integrated into a same device for implementation, step S100 may not be performed, that is, a process in which the PLC transmits the first correspondence to the optical head end may be considered as internal interaction of the device. In the case that the PLC and the optical head end are separately designed, the optical head end may receive the first correspondence in step S100 through communication connection with the PLC.

In a possible implementation, the first correspondence is carried in an optical bus link layer message, and the optical bus link layer message includes at least one of the following: a destination media access control (MAC) address, a media access control MAC address of the PLC, an Ethernet type, a protocol data unit PDU quantity, a timestamp, and a frame check sequence. Optionally, the destination MAC address may indicate one or more MAC addresses of the optical head end. Specifically, in an optical bus link used for communication between the PLC and the optical head end, a sent optical bus link layer message may carry at least one piece of information.

An implementation example of a frame format definition in the optical bus link layer message may be shown in Table 1.

TABLE 1

| Domain name | Domain length (Bytes) | Domain definition |
|---|---|---|
| DA | 6 | Destination MAC address |
| SA | 6 | Source MAC address |
| EtherType | 2 | Ethernet type |
| PDUn | 12-1978 | Protocol data unit, where n is an integer greater than or equal to 0. |
| Timestamp (optional) | 4 | Optional. The timestamp in an upstream packet indicates time at which the PDO data operation is executed, and the timestamp in a downstream packet indicates start time of a PDO data periodicity. The unit is 6.4 ns, indicating a current offset value within 10 s. The time exceeding 10 s will be supplemented by software. Whether this field is carried is identified by t_ind in the PDU. |
| FCS | 4 | Frame check sequence |

Figure 5:
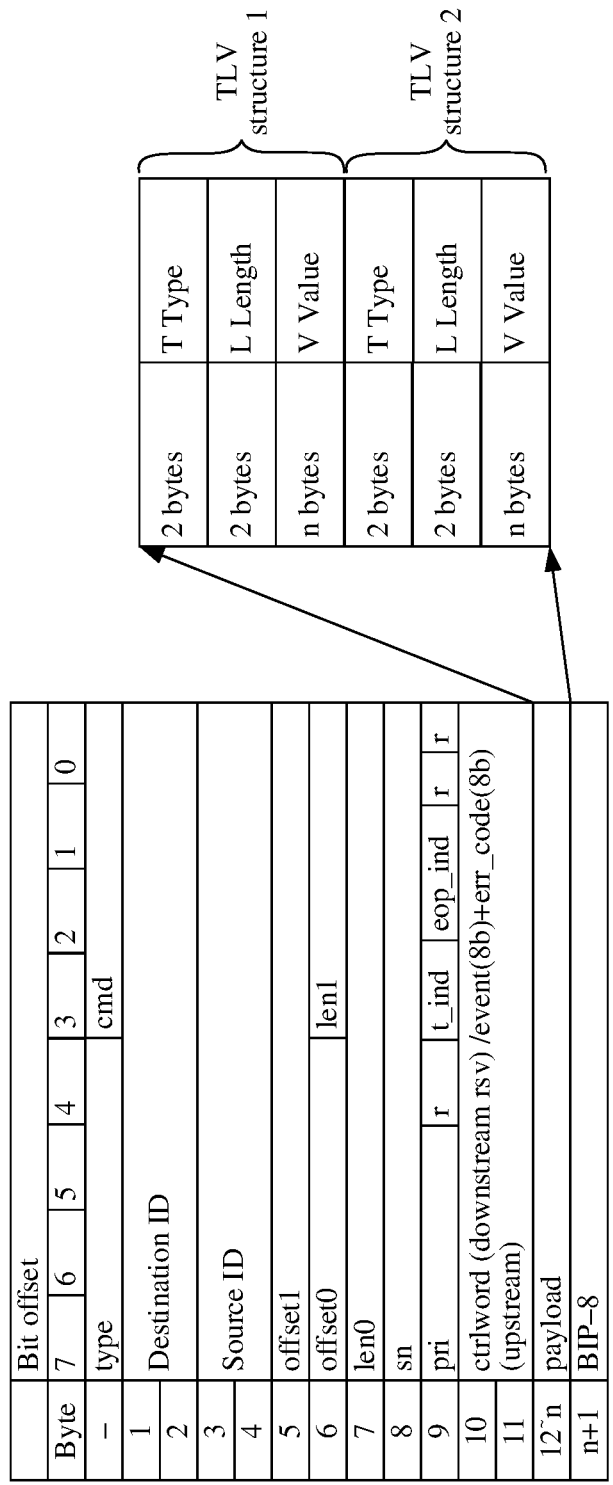
FIG. 5 is another schematic diagram of a communication method according to an embodiment of this application.

Specifically, frame formats shown in Table 1 may be further encapsulated through an implementation shown in FIG. 5. For example, content of a management channel is encapsulated in a payload field of the PDU data. All content of the management channel is transmitted in a type-length-value (TLV) structure, which may be referred to as an extended OAM format. A plurality of TLV messages can be encapsulated a management channel message, but operations on all messages need to be the same. For example, a message for querying content of a plurality of objects may be encapsulated in a management channel message. The length of L indicates the length of the content area, ranging from 0 to 1024 bytes. When the message type is get (read operation), the length of the content area is 0. When the message type is set response (set response operation), the length of the content is 0.

When the slave station manages the channel message, a cmd field in the PDU message is defined as follows:

0: NOP, which is meaningless and ignorable.

1: get (read operation);

2: get response (read response operation);

3: set (set operation);

4: set response (set response operation); and

5: event.

Different operations may be completed using a type field in the TLV structure. In an implementation of a range of a type ID, which is allocated as follows. 0x0 to 0xFFF indicate operations related to the optical head end; 0X1000 to 0x1FFF indicates operations related to the optical terminal/slave station; and 0xF000 to 0xFFFF indicates vendor-defined extended fields. Other fields are reserved temporarily.

In addition, the first correspondence involved in step S100 and the following may carry a correspondence between a slave station device identifier and a slave station node identifier using a table, a graph, a text, code, or the like, or in a plurality of other different forms. The correspondence specifically indicates a slave station node identifier (or referred to as a node ID) allocated by a slave station corresponding to a slave station device identifier. This is not limited herein.

Further, considering that the correspondence between the optical terminal and the slave station may be a one-to-many correspondence, that is, one optical terminal may be connected to one or more slave stations, and in a scenario in which one optical terminal corresponds to one slave station, in the first correspondence, the slave station device identifier may indicate a device identifier of the slave station, or may indicate a device identifier of the optical terminal, where the device identifier of the slave station and the device identifier of the optical terminal are collectively referred to as device information.

In a possible implementation, the device information includes at least one of the following: a type identifier, a length value, a node identifier, a vendor identifier of the optical terminal or the first slave station, a MAC address of the optical terminal or the first slave station, an optical terminal OT model, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

That is, the device information from the optical terminal that is received by the optical head end may include at least one of the foregoing information, and the slave station device identifier may include a partial of the foregoing device information.

In an implementation example, the device information may be implemented as shown in Table 2.

In a possible implementation, corresponding to the device information, in a scenario in which one optical terminal corresponds to one slave station, in the first correspondence, the slave station node identifier may indicate a node identifier of the slave station, or may indicate a node identifier of the optical terminal, and the two are collectively referred to as a node identifier (or referred to as a node ID). The node identifier includes at least one of the following: a type identifier, a length value, a MAC address, and a node identifier. Optionally, the MAC address may indicate a MAC address of the optical terminal or the first slave station.

In an implementation example, the node ID may be implemented as shown in Table 3.

TABLE 3

| Number of bytes | Field | Description |
| --- | --- | --- |
| 2 | Type ID | 0x1001 |
| 2 | Length | A value is 8. |
| 6 | MAC address | Is used as an ID of the slave station. |
| 2 | Node ID | Is a node ID assigned to the slave station. |

S101. An optical head end determines a first correspondence.

In this embodiment, it can be learned from the foregoing content that step S100 is an optional step. When step S100 is performed, the optical head end determines the first correspondence based on step S100. When step S100 is not performed, the optical head end determines the first correspondence by reading information in a PLC module (for example, a vPLC) included in the optical head end in step S101.

The first correspondence indicates a correspondence between a slave station device identifier and a slave station node identifier. For a specific implementation process, refer to the description of step S100. Details are not described herein again.

TABLE 2

| Number of bytes | Field | Description |
| --- | --- | --- |
| 2 | Type ID | 0x1000 |
| 2 | Length | A value is 56. (The value is 2 for the get message.) |
| 2 | Node ID | Slave station ID |
| 4 | Vendor ID | Indicates a complete ID of an optical terminal vendor, which is a 4-byte ASCII code. The value of this field is least significant bit aligned, and 'NULL' of ASCII will be added to a vendor ID field that is less than 4 bytes. |
| 6 | MAC address | Uniquely identifies an ID of an optical terminal. |
| 16 | OT Model | Indicates a model of the optical terminal, which is a 16-byte ASCII code. The value of this field is least significant bit aligned if less than 16 characters. |
| 8 | Hardware Version | Indicates a hardware version number of the optical terminal device, which is an 8-byte ASCII code. The value of this field is least significant bit aligned if less than 8 bytes. |
| 16 | Software Version | Indicates a software version number of the optical terminal device, which is a 16-byte ASCII code. The value of this field is least significant bit aligned if less than 16 bytes. |
| 2 | Chip Model | Indicates a chip model, which is represented by a hexadecimal unsigned number. |
| 1 | Revision | Indicates revision of a chip, which is reported by the optical terminal depending on actual situation of the chip. |
| 3 | IC_Version/Date | Indicates a chip version (hardware). In the case of no version number, the value may be a design date in a format of YY/MM/DD. |

S102. An optical terminal sends a first message to the optical head end.

In this embodiment, the optical terminal sends the first message to the optical head end, where the first message includes device information, the device information includes a first device identifier, and the first device identifier indicates a first slave station connected to the optical terminal. Correspondingly, the optical head end receives the first message from the optical terminal in step S102.

The device information included in the first message includes at least one of the following: a type identifier, a length value, a node identifier, a vendor identifier of the optical terminal or the first slave station, a MAC address of the optical terminal or the first slave station, an optical terminal OT model, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation. For the implementation process, refer to related descriptions in step S100. Details are not described herein again.

In addition, the first slave station may be a slave station connected to the optical terminal, or may be a plurality of slave stations connected to the optical terminal. This is not limited herein.

Specifically, the optical terminal may perform step S102 based on a trigger condition to send the first message to the optical head end. For example, the trigger condition may include that the optical terminal detects that the first slave station is triggered to perform startup or restart, the optical terminal detects that the optical terminal itself is triggered to perform startup or restart, the optical head end receives indication information from the optical head end, the optical head end receives indication information from the PLC, or another trigger condition, which is not limited herein.

S103. The optical head end determines, from the first correspondence, a first node identifier corresponding to the first device identifier.

In this embodiment, the optical head end further determines, based on the first correspondence determined in step S101, the first node identifier corresponding to the first device identifier from the optical head end in step S102. That is, a slave station ID allocated by the optical head end to the first slave station corresponding to the first device identifier in step S103 is the first node identifier.

The first node identifier includes at least one of the following: a type identifier, a length value, a MAC address, and a node identifier. For the implementation process, refer to related descriptions in step S100. Details are not described herein again.

S104. The optical head end sends the first node identifier to the optical terminal.

In this embodiment, the optical head end sends the first node identifier to the optical terminal in step S104. Correspondingly, in step S104, the optical terminal receives the first node identifier sent by the optical head end. After receiving and obtaining the first node identifier in step S104, the optical terminal determines that the first slave station has gone online on the optical head end, and that the working state of the first slave station is an initial state.

In a possible implementation, the first node identifier is carried in an optical network terminal management and control interface OMCI message, and the OMCI message further includes a gigabit passive optical network encapsulation mode port identifier GEMport ID. Alternatively, the first node identifier is carried in an operation, administration, and maintenance OAM message, and the OAM message further includes a logical link identifier LLID.

Specifically, the optical head end and the optical terminal may be implemented in a plurality of communication manners. When the communication manner is a gigabit PON (GPON) in a passive optical network (PON), the first node identifier sent by the optical head end to the optical terminal may be carried in the optical network terminal management and control interface (OMCI) message, where the OMCI message carries a port identifier (GPON/10G GPON/50G GPON encapsulation mode/method port identifier, GEMport ID) of a gigabit passive optical network encapsulation mode. When the communication manner is an Ethernet PON (EPON), a 10 gigabit Ethernet PON (10G ethernet passive optical network, 10G-EPON), the first node identifier sent by the optical head end to the optical terminal may be carried in the optical network terminal management and control interface (OAM) message, where the OAM message carries a logical link identifier (LLID).

Figure 6:
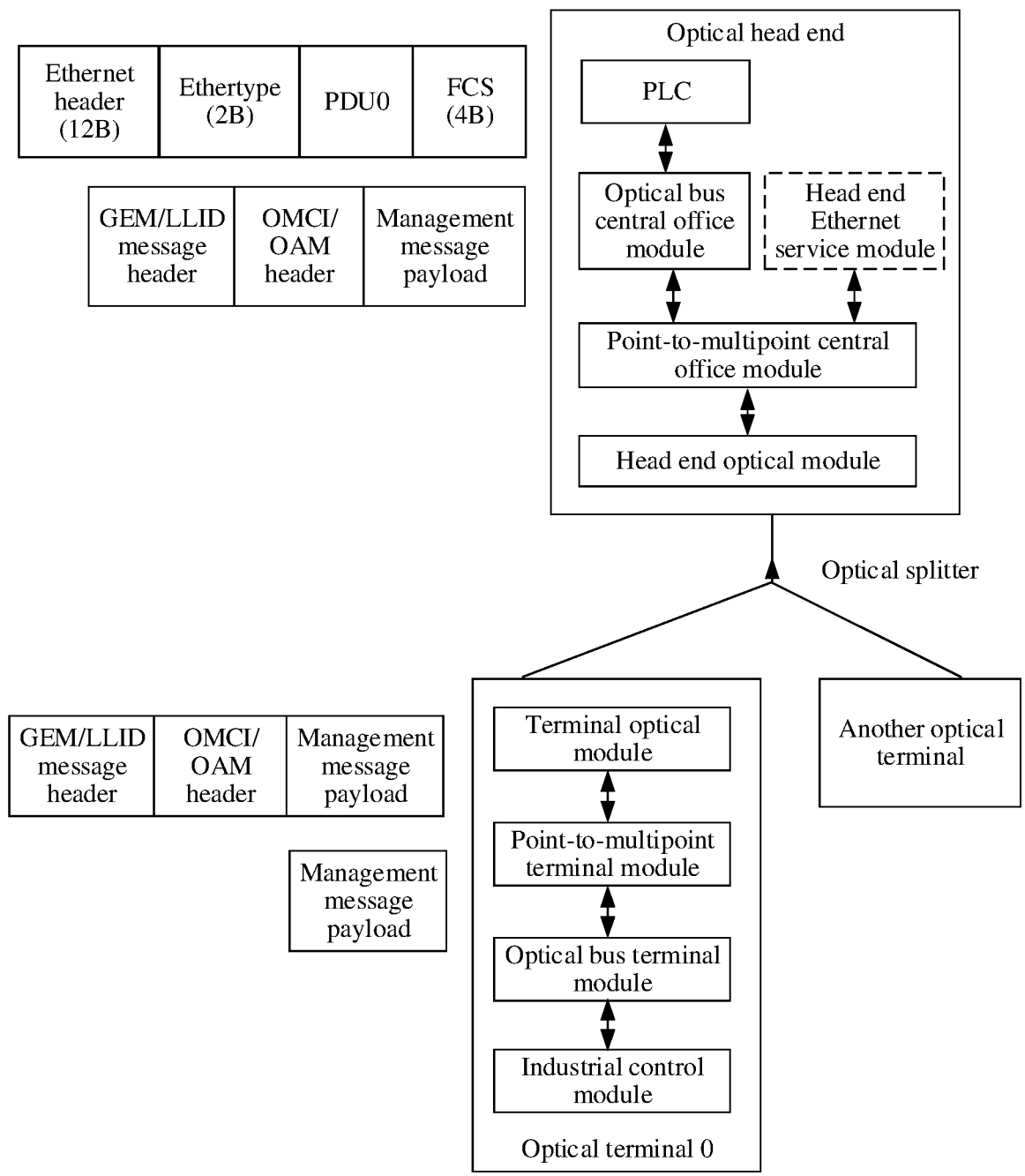
FIG. 6 is another schematic diagram of a communication method according to an embodiment of this application.

In an implementation example, referring to an implementation process shown in FIG. 6, a communication process between an optical head end and an optical terminal (an optical terminal 0) is used as an example. Content that a PLC sends to the optical head end is a link layer message of an optical bus, which corresponds to a message format received by an optical bus central office module in the optical head end, including an Ethernet header (12 bits (12B)), an Ethernet type (2 bits (Ethertype 2B)), an indication PDU quantity 0 (PDU0), and a frame check sequence (FCS) (4 bits (4B)). When the message needs to be sent to the optical terminal/slave station, the message needs to be converted into a point-to-multipoint management message, that is, a management message transmitted between a point-to-multipoint central office module in the optical head end and a point-to-multipoint terminal module in the optical terminal 0.

In a GPON/10G GPON system, this message is an OMCI message. In an EPON/10G EPON system, this message is an OAM message. A point-to-multipoint identifier needs to be added before the management message. In the GPON/10G GPON system, the ID is a GEMport ID. In the EPON/10G EPON system, the ID is an LLID. Then, an optical bus terminal module in the optical terminal 0 extracts the management message to obtain a management message payload, and directly delivers an instruction to the slave station based on the management message payload, to manage the slave station.

It should be noted that another message exchanged between the optical head end and the optical terminal may also be implemented in a plurality of communication manners. Refer to the foregoing content. Details are not described herein again.

In a possible implementation, before step S104, the optical head end may further determine a second correspondence, where the second correspondence indicates a correspondence between the optical terminal and at least one slave station connected to the optical terminal, and the at least one slave station includes the first slave station. Specifically, the optical terminal may be connected to at least one slave station to implement communication with the at least one slave station, that is, one optical terminal may correspond to one or more slave stations. Before the optical head end sends the first node identifier to the optical terminal in step S104, that is, before the optical head end determines that the first slave station goes online, the optical head end may determine a correspondence between the optical terminal and the at least one slave station connected to the optical terminal through pre-configuration in the optical head end, or through configuration for the optical head end using the PLC. Subsequently, the optical head end may determine, based on the correspondence, the first slave station from the at least one slave station corresponding to the optical terminal, and implements management of the first slave station.

S105. The optical head end sends a notification message to the PLC.

In this embodiment, the optical head end sends, to the PLC in step S105, a notification message used to indicate the first slave station to go online, where the notification message includes the first node identifier. Correspondingly, the PLC receives the notification message from the optical head end in step S105. After receiving the notification message in step S105, the PLC determines that the first slave station has gone online on the optical head end, and a working state of the first slave station is an initial state.

In a possible implementation, after the optical head end sends the first node identifier to the optical terminal, the method further includes: sending a notification message to the PLC, where the notification message indicates the first slave station to go online, and the notification message includes the first node identifier. Specifically, after the optical head end sends the first node identifier to the optical terminal, the optical head end may send, to the PLC, a notification message that indicates the first slave station to go online, so that the PLC determines that the first slave station has gone online. Subsequently, the PLC may implement another management operation on the first slave station, for example, exchange of device capability information, exchange of process data object (PDO) configuration information, and exchange of PDO data.

Based on the foregoing technical solution, the optical head end first determines a first correspondence including the correspondence between the slave station device identifier and the slave station node identifier, where the first correspondence is used to configure the slave station to go online. Then, in a process in which the first slave station goes online, the optical head end receives a first message that is from the optical terminal and includes a first device identifier through an optical fiber communication connection with the optical terminal, and determines, from the first correspondence, a first node identifier corresponding to the first device identifier. Further, the optical head end sends the first node identifier to the optical terminal through the optical fiber communication connection with the optical terminal. The first slave station is configured to go online through optical fiber communication between the optical head end and the optical terminal end. That is, management for a slave station is implemented through optical fiber communication. Compared with a conventional communication manner of using a twisted pair connection in a field bus network, this can greatly reduce a transmission delay, and improve communication efficiency.

In an implementation process of step S100 to step S105, the optical head end may manage the slave station connected to the optical terminal, so that the first slave station goes online on the optical head end (or PLC) side, and the first slave station is in the initial state. Then, another management operation may be further performed on the slave station, so that the first slave station enters a pre-operation state, an operation state, an emergency state, or the like.

Specifically, when the first slave station is in the initial state, in this state, the PLC needs to complete numbering of the slave station, and the optical terminal needs to establish a normal connection relationship with the optical head end. When the first slave station is in the pre-operation state, in this state, the PLC needs to perform capability negotiation with the slave station to complete all configuration work. When the first slave station is in the operation state, the slave station starts the field bus to work. When the first slave station is in the emergency state, the slave station enters an emergency protection state. In this case, no operation instruction can be executed, and the slave station may enter a security protection state.

It should be noted that the different states of the first slave station may not be limited to the foregoing four states. For example, the foregoing different states may be combined or split for description (for example, the pre-operation state and the operation state are combined into a same state for representation, or the initial state and the pre-operation state are combined into a same state for representation), or may be implemented through another state name (for example, the operation state is represented by using a synchronization state, or the pre-operation state is represented by using a pre-synchronization state). This is not limited herein.

The following provides description through a specific implementation example. Based on step S100 to step S105 shown in FIG. 4, the communication method may further include the following steps.

S106. The optical head end sends first indication information to the optical terminal.

In this embodiment, the optical head end sends, to the optical terminal in step S106, the first indication information used to request device capability information of the first slave station. Correspondingly, the optical terminal receives and obtains the first indication information from the optical head end in step S106.

After receiving the first indication information in step S106, the optical terminal may switch from the initial state to the pre-operation state.

It should be noted that step S106 is an optional step. That is, after determining, in step S104, that the first slave station enters the initial state, the optical terminal (or the first slave station) may enter the pre-operation state within predetermined duration (or in response to a user operation) and perform step S107. In this scenario, step S106 does not need to be performed.

In a possible implementation, in step S104, after the optical head end sends the first node identifier to the optical terminal, the optical head end sends first indication information to the optical terminal in step S106, where the first indication information is used to request the device capability information of the first slave station. Specifically, after step S104, that is, after the optical head end determines that the first slave station goes online, the optical head end may further obtain device capability information of the first slave station through the optical communication connection with the optical terminal, so that the optical head end may subsequently implement another management operation on the first slave station based on the device capability information of the first slave station, for example, the exchange of the PDO configuration information and the exchange of the PDO data.

In addition, in step S106, the first indication information sent by the optical head end to the optical terminal may be from the PLC, and the optical head end triggers, based on an indication of the PLC, to perform step S106.

S107. The PLC, the optical head end, the optical terminal, and the first slave station exchange the device capability information.

In this embodiment, the PLC, the optical head end, the optical terminal, and the first slave station exchange the device capability information. That is, after step S106, the first slave station sends the device capability information of the first slave station to the PLC through the optical terminal and the optical head end in sequence.

Optionally, the device capability information may also be referred to as data dictionary information, capability information, or other information used to indicate a device capability of the first slave station.

For example, the device capability information may be an ordered object group, which describes a part or all of parameters corresponding to the slave station, and may include a storage position of communication data. The device capability information may be transmitted in a form of an electronic data sheet (EDS) file. Generally, the device capability information may include at least one of device identifier information (for example, a manufacturer ID, a product code, a version number, and a serial number), a device vendor device name, a manufacturer hardware version, a manufacturer software version, a PDO mapping receiving structure, a PDO mapping sending structure, or other information.

In a possible implementation, in step S107, after the optical terminal sends the device capability information to the optical head end, the optical head end sends the device capability information to the PLC. Specifically, after the optical head end obtains the device capability information of the first slave station, the optical head end may send the device capability information to the PLC, so that the PLC may implement another management operation on the first slave station based on the device capability information.

S108. The optical head end sends second indication information to the optical terminal.

In this embodiment, the optical head end sends, to the optical terminal in step S108, the second indication information indicating the first slave station to enter the emergency state. Correspondingly, the optical terminal receives the second indication information from the optical head end in step S108.

Optionally, after receiving the second indication information in step S108, the optical terminal further sends the second indication information to the first slave station.

Optionally, the optical head end sends the second indication information to the optical terminal based on the indication of the PLC.

In a possible implementation, the method further includes: The optical head end sends second indication information to the optical terminal, where the second indication information indicates the first slave station to enter an emergency state.

Optionally, the second indication information indicates the first slave station to enter an emergency state, and may specifically indicate the first slave station to enter an emergency-stop state. In the emergency-stop state, the first slave station no longer periodically performs an action, and turns off or shuts down the action performed by the first slave station, to avoid damage to persons or machines. Specifically, the optical head end that manages the first slave station may send, to the optical terminal, the second indication information indicating the first slave station to enter the emergency state, so that the first slave station connected to the optical terminal enters the security protection state, to avoid damage to persons or machines.

Optionally, the method further includes: The optical head end receives the second indication information from the PLC.

It should be noted that there may be a plurality of trigger conditions for step S108, for example, in response to operation instructions of a user, the PLC detects that the optical terminal or the device of the first slave station is abnormal, the optical head end detects that the optical terminal or the device of the first slave station is abnormal, or another trigger condition, which is not limited herein.

In addition, step S108 may be performed before or after any step shown in FIG. 4, so that the first slave station enters the emergency state after receiving the second indication information, and turns off or shuts down an action performed by the first slave station, to avoid damage to persons or machines.

Further, after step S108, if the optical head end or the PLC determines that the first slave station does not need to keep in the emergency state, the optical terminal may send a message of releasing the emergency state of the slave station to the first slave station, so that the first slave station receives the message of releasing the emergency state of the slave station, exits the emergency state, and switches to the initial state.

S109. The PLC sends PDO configuration information to the optical head end.

In this embodiment, the PLC sends the PDO configuration information to the optical head end in step S109, and correspondingly, the optical head end receives the PDO configuration information from the PLC in step S109.

In a possible implementation, after step S104, that is, after the optical head end determines that the first slave station goes online, the optical head end may determine the PDO configuration information of the first slave station and send the PDO configuration information to the optical terminal, so that the exchange of the PDO data can be subsequently performed between the optical head end and the optical terminal based on the PDO configuration information.

Specifically, the PDO configuration information includes at least one of the following: a sending periodicity of PDO data, a memory access address of the PDO data, mapping of a PDO data object, or other PDO configuration information, for example, a single slave station periodicity of a cycle periodicity specified for a slave station, and a periodicity data amount indicating a length of data received and sent in the cycle periodicity.

In step S109, the optical head end may determine the PDO configuration information of the first slave station based on configuration of the PLC, and after determining that the first slave station goes online, send the PDO configuration information of the first slave station to the first slave station, so that the PLC and the first slave station may subsequently perform the exchange of the PDO data based on the PDO configuration information through the optical fiber communication connection between the optical head end and the optical terminal.

S110. The optical head end determines the PDO configuration information.

In this embodiment, step S109 is an optional step. When step S109 is performed, the optical head end determines the PDO configuration information based on step S109. When step S109 is not performed, the optical head end determines the PDO configuration information by reading information in a PLC module (for example, a vPLC) included in the optical head end in step S110.

S111. The optical head end sends the PDO configuration information to the optical terminal.

In this embodiment, the optical head end sends the PDO configuration information to the optical terminal in step S111, and correspondingly, the optical terminal receives the PDO configuration information from the optical head end in step S111. Then, the optical terminal may configure the first slave station based on the PDO configuration information.

Specifically, the PDO configuration information in the pre-operation state may be delivered through configuration processes in step S109 to step S111, so that the first slave station performs related configuration for a subsequent exchange process of the PDO data based on the PDO configuration information.

Optionally, the configuration processes of step S109 to step S111 may not be performed. For example, when there is a historical access process between the first slave station and the optical head end (or the PLC), the first slave station may use a PDO configuration of the historical access. Further, the optical head end (or the PLC) may perform the configuration processes of step S109 to step S111 only when the PDO configuration information of the first slave station is updated.

S112. The optical head end sends fourth indication information to the optical terminal.

In this embodiment, the optical head end sends the fourth indication information to the optical terminal in step S112. Correspondingly, the optical terminal receives the fourth indication information from the optical head end in step S110.

Specifically, the fourth indication information indicates the first slave station to enter the operation state. For example, that the first slave station enters the operation state may indicate the first slave station to start the field bus to work. After step S104, that is, after the optical head end determines that the first slave station goes online, the optical head end may send, to the optical terminal, the fourth indication information indicating the first slave station to enter the operation state, and perform the exchange of the PDO data after the first slave station enters the operation state.

Optionally, the fourth indication information sent by the optical head end to the optical terminal may be from a PLC, and the optical head end triggers, based on the indication of the PLC, step S112.

It should be noted that step S112 is an optional step. That is, after determining, in step S104, that the first slave station enters the initial state, the optical terminal (or the first slave station) may enter the operation state within predetermined duration (or in response to a user operation) and perform step S113. In this scenario, step S112 does not need to be performed.

S113. Perform the exchange of the PDO data between the PLC, the optical head end, the optical terminal, and the first slave station.

In this embodiment, the PLC, the optical head end, the optical terminal, and the first slave station exchange the device capability information. That is, after step S113, the PLC sends, to the first slave station through the optical head end and the optical terminal in sequence, third indication information used to request the PDO of the first slave station. Then, the first slave station sends the PDO of the first slave station to the PLC through the optical terminal and the optical head end in sequence, to implement the exchange of the PDO data.

In a possible implementation, after step S104, in step S113, the optical head end sends third indication information to the optical terminal, where the third indication information is used to request process data PDO of the first slave station. The optical head end receives the PDO from the optical terminal. After the optical head end determines that the first slave station goes online, the optical head end may send, to the optical terminal, the third indication information used to request the PDO of the first slave station, and receive the PDO from the terminal, to implement the exchange of the PDO data and management of the first slave station.

Optionally, the third indication information sent by the optical head end to the optical terminal may be from a PLC, and the optical head end triggers, based on the indication of the PLC, step S113.

In this embodiment, through the foregoing implementation processes of step S106 to step S113, the first slave station may be managed by using the communication method, and the first slave station is switched in different states. A specific switching process may be implemented through an example shown in Table 4.

TABLE 4

| | State | | | |
|---|---|---|---|---|
| Event | Initial state | Pre-operation state | Operation state | Emergency state |
| A slave station goes offline. | –> Initial state | –> Initial state | –> Initial state | –> Initial state |
| The slave station successfully allocates a slave station ID. | –> Pre-operation state | — | — | — |
| Receive a message of starting an operation state. | — | –> Operation state | — | — |
| Receive a message of entering an emergency state/the slave station detects an exception. | — | –> Emergency state | –> Emergency state | — |
| Receive a message of releasing the emergency state of the slave station. | — | — | — | –> Initial state |

Figure 7A:
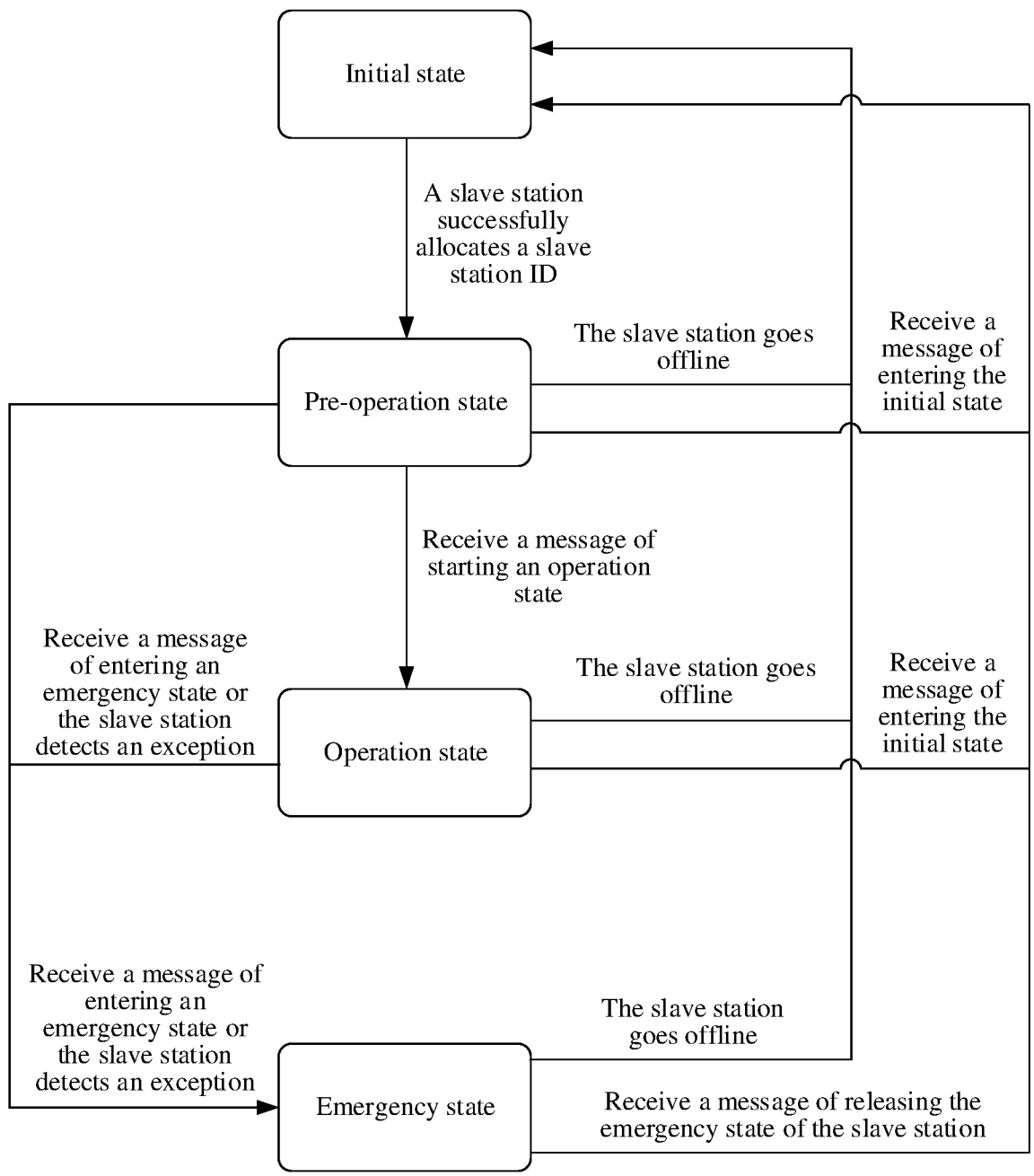
FIG. 7a is another schematic diagram of a communication method according to an embodiment of this application.

For example, the implementation example shown in Table 4 may be described through a switching process shown in FIG. 7a, including the following processes.

If the state of the slave station is the initial state, the slave station may be triggered to switch to the pre-operation state based on an event that the slave station successfully allocates the slave station ID, for example, the foregoing step S106.

If the state of the slave station is the pre-operation state, the slave station may be triggered to switch to the operation state based on the received message of starting an operation state, for example, the foregoing step S112.

If the state of the slave station is the pre-operation state, the operation state, or the emergency state, the slave station may be triggered to switch to the initial state based on an event that the slave station goes offline.

If the state of the slave station is the pre-operation state or the operation state, the slave station may be triggered to switch to the emergency state based on an event that the slave station receives a message of entering the emergency state or detects an exception, for example, the foregoing step S108.

If the state of the slave station is the pre-operation state or the operation state, the slave station may be triggered to switch to the initial state based on the received message of entering the initial state.

If the state of the slave station is the emergency state, the slave station may be triggered to switch to the initial state may be triggered based on the received message of releasing the emergency state of the slave station.

Figure 7B:
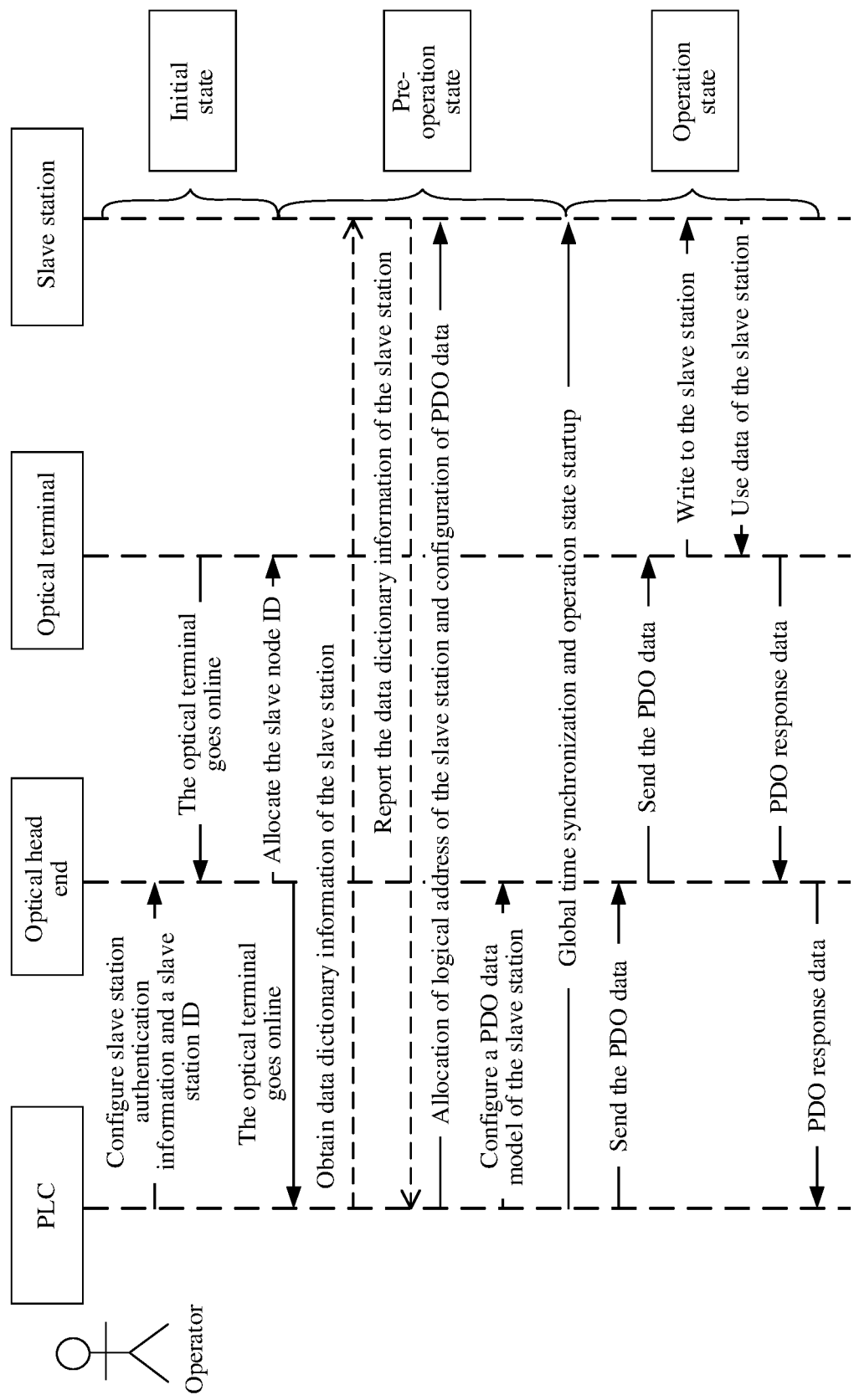
FIG. 7b is another schematic diagram of a communication method according to an embodiment of this application.

In addition, in another implementation example of the communication method, the communication method may be represented as an implementation shown in FIG. 7b with reference to switching between the foregoing plurality of states.

As shown, a typical flowchart from the time when a slave station goes online to the time when the slave station works properly is illustrated. Operators can manage the slave station on the PLC. The specific steps are as follows.

In the implementation process of the initial state, the PLC configures slave station authentication information and the slave station ID for the optical head end (for example, step S100). Then, the optical terminal sends an optical terminal online message to the optical head end (for example, step S102). Then, the optical head end allocates a slave node ID to the optical terminal (for example, step S104), and sends a notification message indicating that the optical terminal successfully goes online to the PLC (for example, step S105).

In the implementation process of the pre-operation state, the PLC and the master station exchange a slave station data dictionary, and the PLC obtains a capability of the slave station (optional, for example, step S107). Then, the PLC configures a PDO data model such as a single slave station periodicity and a periodic data amount for the slave station through the optical head end (for example, step S109 to step S111), to implement address management between the PLC and the slave station and configure PDO related information.

In the implementation process of the operation state, global time synchronization and the operation state are started (for example, step S112). Then, in a small periodicity, the PLC sends the PDO data to the optical terminal through the optical head end, and the optical terminal writes the PDO data into the slave station. After that, the optical terminal collects data of the slave station, and reports PDO response data to the PLC through the optical head end, to implement the exchange of the PDO data (for example, step S113).

The foregoing describes embodiments of this application from a perspective of a method. The following describes a communication apparatus in embodiments of this application from a perspective of specific apparatus implementation.

Figure 8:
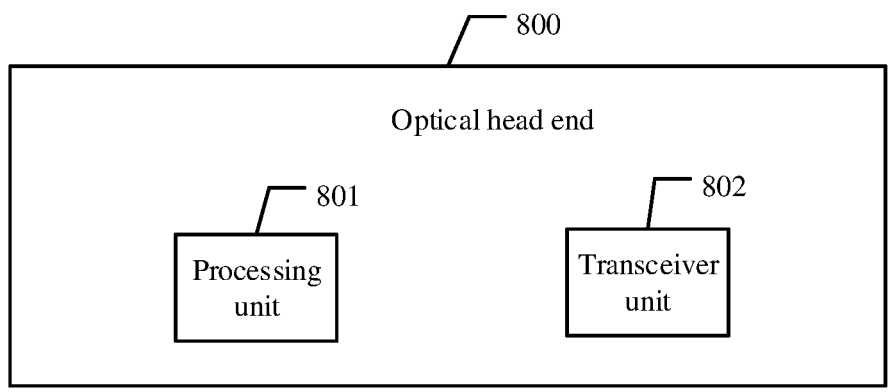
FIG. 8 is a schematic diagram of an optical head end according to an embodiment of this application.

Refer to FIG. 8, which is a schematic diagram of an apparatus of an optical head end 800 according to an embodiment of this application. The optical head end 800 includes a processing unit 801 and a transceiver unit 802.

The processing unit 801 is configured to determine a first correspondence, where the first correspondence indicates a correspondence between a slave station device identifier and a slave station node identifier.

The transceiver unit 802 is configured to receive a first message from an optical terminal, where the first message includes device information, the device information includes a first device identifier, and the first device identifier indicates a first slave station connected to the optical terminal.

The processing unit 801 is further configured to determine, from the first correspondence, a first node identifier corresponding to the first device identifier.

The transceiver unit 802 is further configured to send the first node identifier to the optical terminal.

In a possible implementation, the processing unit 801 is specifically configured to receive the first correspondence from a programmable logic controller PLC using the transceiver unit.

In a possible implementation, the transceiver unit 802 is further configured to send a notification message to the PLC, where the notification message indicates the first slave station to go online, and the notification message includes the first node identifier.

In a possible implementation, the transceiver unit 802 is further configured to send first indication information to the optical terminal, where the first indication information is used to request device capability information of the first slave station.

The transceiver unit 802 is further configured to receive the device capability information from the optical terminal.

In a possible implementation, the transceiver unit 802 is further configured to send the device capability information to the PLC.

In a possible implementation, the transceiver unit 802 is further configured to receive the first indication information from the PLC.

In a possible implementation, the processing unit 801 is further configured to determine PDO configuration information of the first slave station.

The transceiver unit 802 is further configured to send the PDO configuration information to the optical terminal.

In a possible implementation, the PDO configuration information includes at least one of the following:
 a sending periodicity of PDO data, a memory access address of the PDO data, and mapping of a PDO data object.

In a possible implementation, the processing unit 801 is specifically configured to receive the PDO configuration information of the first slave station from the PLC using the transceiver unit.

In a possible implementation, the processing unit 801 is further configured to determine a second correspondence, where the second correspondence indicates a correspondence between the optical terminal and at least one slave station connected to the optical terminal, and the at least one slave station includes the first slave station.

In a possible implementation, the first node identifier is carried in an optical network terminal management and control interface OMCI message, and the OMCI message further includes a gigabit passive optical network encapsulation mode port identifier GEMport ID.

The first node identifier is carried in an operation, administration, and maintenance OAM message, and the OAM message further includes a logical link identifier LLID.

In a possible implementation, the first correspondence is carried in an optical bus link layer message, and the optical bus link layer message includes at least one of the following:
  a destination MAC address, a media access control MAC address of the PLC, an Ethernet type, a protocol data unit PDU quantity, a timestamp, and a frame check sequence.

In a possible implementation, the first node identifier includes at least one of the following:
  a type identifier, a length value, a MAC address, and a node identifier.

In a possible implementation, the device information includes at least one of the following:
  a type identifier, a length value, a node identifier, a vendor identifier of the optical terminal or the first slave station, a MAC address of the optical terminal or the first slave station, an OT model of the optical terminal, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

In a possible implementation, the transceiver unit 802 is further configured to send second indication information to the optical terminal, where the second indication information indicates the first slave station to enter an emergency state.

In a possible implementation, the transceiver unit 802 is further configured for the optical terminal to send third indication information, where the third indication information is used to request process data PDO of the first slave station.

The optical head end receives the PDO from the optical terminal.

In a possible implementation, the transceiver unit 802 is further configured to send the PDO to the PLC.

In a possible implementation, the transceiver unit 802 is further configured to receive the third indication information from the PLC.

In a possible implementation, the transceiver unit 802 is further configured to send fourth indication information to the optical terminal, where the fourth indication information indicates the first slave station to enter an operation state.

For specific implementation processes of the processing unit 801 and the transceiver unit 802 in the optical head end 800, refer to the descriptions in the foregoing method embodiments. Details are not described herein again.

Figure 9:
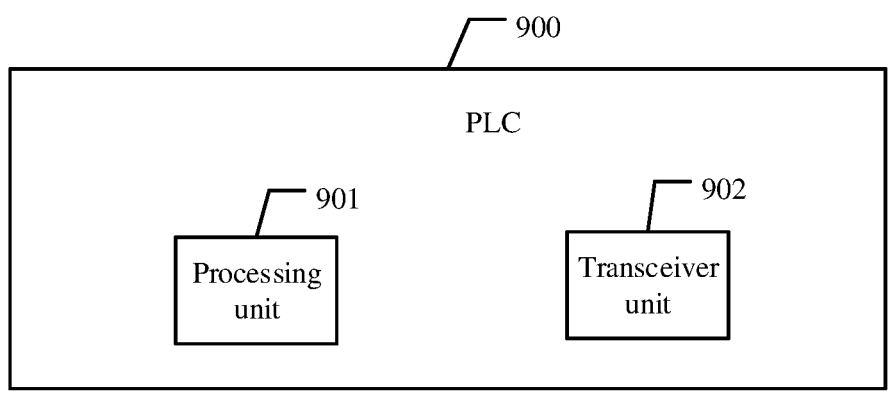
FIG. 9 is a schematic diagram of a PLC according to an embodiment of this application.

FIG. 9 is a schematic diagram of a PLC 900 according to an embodiment of this application. The PLC 900 includes a processing unit 901 and a transceiver unit 902.

The processing unit 901 is configured to determine a first correspondence, where the first correspondence indicates a correspondence between a slave station device identifier and a slave station node identifier, the correspondence indicates that at least a first device identifier corresponds a first node identifier, and the first device identifier indicates a first slave station connected to an optical terminal.

The transceiver unit 902 is configured to send the first correspondence to an optical head end.

The transceiver unit 902 is further configured to receive a notification message from the optical head end, where the notification message indicates the first slave station to go online, and the notification message includes the first node identifier.

In a possible implementation, the transceiver unit 902 is further configured to send first indication information to the optical head end, where the first indication information is used to request device capability information of the first slave station.

The PLC receives the device capability information from the optical head end.

In a possible implementation, the transceiver unit 902 is further configured to send PDO configuration information of the first slave station to the optical head end.

In a possible implementation, the PDO configuration information includes at least one of the following:
  a sending periodicity of PDO data, a memory access address of the PDO data, and mapping of a PDO data object.

In a possible implementation, the first correspondence is carried in an optical bus link layer message, and the optical bus link layer message includes at least one of the following:
  a destination MAC address, a source MAC address of the PLC, an Ethernet type, a protocol data unit PDU quantity, a timestamp, and a frame check sequence.

In a possible implementation, the first node identifier includes at least one of the following:
  a type identifier, a length value, a MAC address, and a node identifier.

In a possible implementation, device information includes at least one of the following:
  a type identifier, a length value, a node identifier, a vendor identifier of the optical terminal or the first slave station, a MAC address of the optical terminal or the first slave station, an OT model of the optical terminal or the first slave station, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

In a possible implementation, the transceiver unit 902 is further configured to send second indication information to the optical head end, where the second indication information indicates the first slave station to enter an emergency state.

In a possible implementation, the transceiver unit 902 is further configured to send third indication information to the optical head end, where the third indication information is used to request process data PDO of the first slave station.

The transceiver unit 902 is further configured to receive the PDO from the optical head end.

In a possible implementation, the transceiver unit 902 is further configured to send fourth indication information to the optical head end, where the fourth indication information indicates the first slave station to enter an operation state.

For specific implementation processes of the processing unit 901 and the transceiver unit 902 in the PLC 900, refer to the descriptions in the foregoing method embodiments. Details are not described herein again.

Figure 10:
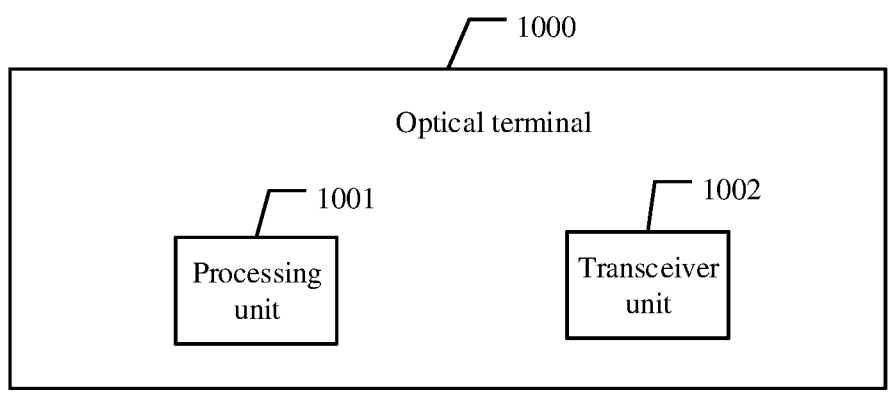
FIG. 10 is a schematic diagram of an optical terminal according to an embodiment of this application.

Refer to FIG. 10, which is a schematic diagram of an optical terminal moo according to an embodiment of this application. The optical terminal moo includes a processing unit 1001 and a transceiver unit 1002.

The processing unit 1001 is configured to determine a first device identifier, where the first device identifier indicates a first slave station connected to the optical terminal.

The transceiver unit 1002 is configured to send a first message to an optical head end, where the first message includes the first device identifier.

The transceiver unit 1002 is further configured to receive a first node identifier from the optical head end, where the first device identifier corresponds to the first node identifier.

In a possible implementation, the transceiver unit 1002 is further configured to receive first indication information from the optical head end, where the first indication information is used to request device capability information of the first slave station.

The processing unit 1001 is further configured to determine the device capability information based on the first indication information.

The transceiver unit 1002 is further configured to send the device capability information to the optical head end.

In a possible implementation, the transceiver unit 1002 is further configured to receive PDO configuration information of a first slave station from the optical head end.

The transceiver unit 1002 is further configured to send the PDO configuration information to the first slave station.

In a possible implementation, the first node identifier is carried in an optical network terminal management and control interface OMCI message, and the OMCI message further includes a gigabit passive optical network encapsulation mode port identifier GEMport ID.

The first node identifier is carried in an operation, administration, and maintenance OAM message, and the OAM message further includes a logical link identifier LLID.

In a possible implementation, the first node identifier includes at least one of the following:
 a type identifier, a length value, a MAC address, and a node identifier.

In a possible implementation, the device information includes at least one of the following:
 a type identifier, a length value, a node identifier, a vendor identifier of the optical terminal or the first slave station, a MAC address of the optical terminal or the first slave station, an OT model of the optical terminal or the first slave station, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, and an input parameter obtained in response to a user operation.

In a possible implementation, the transceiver unit 1002 is further configured to receive second indication information from the optical head end, where the second indication information indicates the first slave station to enter an emergency state.

The transceiver unit 1002 is further configured to send the second indication information to the first slave station.

In a possible implementation, the transceiver unit 1002 is further configured to receive third indication information from the optical head end, where the third indication information is used to request process data PDO corresponding to the node identifier of the first slave station.

The processing unit 1001 is further configured to determine the PDO based on the third indication information.

The transceiver unit 1002 is further configured to send the PDO to the optical head end.

In a possible implementation, the transceiver unit 1002 is further configured to receive fourth indication information from the optical head end, where the fourth indication information indicates the first slave station corresponding to the node identifier of the first slave station to enter an operation state.

The transceiver unit 1002 is further configured to send the fourth indication information to the first slave station.

For a specific implementation process of the processing unit 1001 and the transceiver unit 1002 in the optical terminal moo, refer to the description in the foregoing method embodiment. Details are not described herein again.

Figure 11:
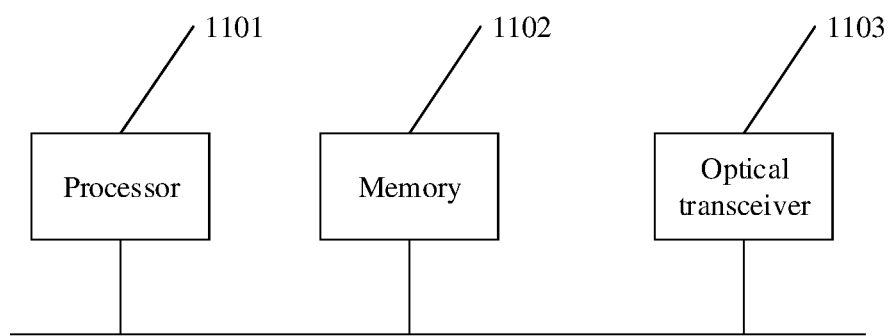
FIG. 11 is a schematic diagram of a communication device according to an embodiment of this application.

Refer to FIG. 11, which is a schematic diagram of implementation of a communication device according to an embodiment of this application. The communication device may be an optical head end, a PLC, or an optical terminal in any one of the foregoing embodiments. The communication device includes at least a processor 1101, a memory 1102, and an optical transceiver 1103.

When the communication device shown in FIG. 11 implements the method corresponding to the optical head end, the memory 1102 is configured to store a computer program executed by the optical head end, and the processor 1101 is configured to execute the computer program, to process related data/signaling and implement data/signaling receiving and sending through the optical transceiver 1103. The processor 1101 may perform an implementation process corresponding to the processing unit 801 shown in FIG. 8, and the optical transceiver 1103 may perform an implementation process corresponding to the transceiver unit 802 shown in FIG. 8. Details are not described herein again.

When the communication device shown in FIG. 11 implements the method corresponding to the PLC, the memory 1102 is configured to store a computer program executed by the PLC, and the processor 1101 is configured to execute the computer program, to process related data/signaling and implement data/signaling receiving and sending through the optical transceiver 1103. The processor 1101 may perform an implementation process corresponding to the processing unit 901 shown in FIG. 9, and the optical transceiver 1103 may perform an implementation process corresponding to the transceiver unit 902 shown in FIG. 9. Details are not described herein again.

When the communication device shown in FIG. 11 implements the method corresponding to the foregoing optical terminal, the memory 1102 is configured to store a computer program executed by the optical terminal, and the processor 1101 is configured to execute the computer program, to process related data/signaling and implement data/signaling receiving and sending through the optical transceiver 1103. The processor 1101 may perform an implementation process corresponding to the processing unit 1001 shown in FIG. 10, and the optical transceiver 1103 may perform an implementation process corresponding to the transceiver unit 1002 shown in FIG. 10. Details are not described herein again.

An embodiment of this application further provides a computer-readable storage medium that stores one or more computer executable instructions. When the computer executable instructions are executed by a processor, the processor performs the method described in the possible implementations of the communication apparatus (implemented by an optical head end, a PLC, or an optical terminal) in the foregoing embodiments.

An embodiment of this application further provides a computer program product (or referred to as a computer program) that stores one or more computers. When the computer program product is executed by a processor, the processor performs the method in the possible implementation of the foregoing communication apparatus (implemented by an optical head end, a PLC, or an optical terminal).

An embodiment of this application further provides a chip system. The chip system includes at least one processor, configured to support a terminal device in implementing functions in possible implementations of the foregoing communication apparatus (implemented by an optical head end, a PLC, or an optical terminal). Optionally, the chip system further includes an interface circuit, and the interface circuit provides program instructions and/or data for the at least one processor.

In a possible design, the chip system may further include a memory. The memory is configured to store program instructions and data that are required for the terminal device. The chip system may include a chip, or may include a chip and another discrete component.

An embodiment of this application further provides a communication system. The network system architecture includes the communication apparatus (including the optical head end and the PLC) in any one of the foregoing embodiments.

Optionally, the communication system may further include the optical terminal in any one of the foregoing embodiments.

Optionally, the communication system may further include the slave station in any one of the foregoing embodiments.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit. When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of embodiments of this application, and are not intended to limit the protection scope of embodiments of this application. Any variation or replacement that a person skilled in the art can easily figure out within the technical scope disclosed in embodiments of this application shall fall within the protection scope of embodiments of this application. Therefore, the protection scope of embodiments of this application shall be subject to the protection scope of the claims.

What is claimed is:

1. A method, comprising:
   determining, by an optical head end, a first correspondence, wherein the first correspondence indicates a correspondence between a slave station device identifier and a slave station node identifier;
   receiving, by the optical head end, a first message from an optical terminal, wherein the first message comprises device information, the device information comprises a first device identifier, and the first device identifier indicates a first slave station connected to the optical terminal;
   determining, by the optical head end based on the first correspondence, a first node identifier corresponding to the first device identifier; and
   sending, by the optical head end, the first node identifier to the optical terminal.

2. The method according to claim 1, wherein determining, by the optical head end, the first correspondence comprises:
   receiving, by the optical head end, the first correspondence from a programmable logic controller (PLC).

3. The method according to claim 2, wherein after sending, by the optical head end, the first node identifier to the optical terminal, the method further comprises:
   sending a notification message to the PLC, wherein the notification message indicates the first slave station to go online, and the notification message comprises the first node identifier.

4. The method according to claim 2, wherein after sending, by the optical head end, the first node identifier to the optical terminal, the method further comprises:
   sending, by the optical head end, first indication information to the optical terminal, wherein the first indication information requests device capability information of the first slave station; and
   receiving, by the optical head end, the device capability information from the optical terminal.

5. The method according to claim 4, wherein the method further comprises:
   sending, by the optical head end, the device capability information to the PLC.

6. The method according to claim 4, wherein before sending, by the optical head end, first indication information to the optical terminal, the method further comprises:

receiving, by the optical head end, the first indication information from the PLC.

7. The method according to claim 2, wherein after sending, by the optical head end, the first node identifier to the optical terminal, the method further comprises:
determining, by the optical head end, PDO configuration information of the first slave station; and
sending, by the optical head end, the PDO configuration information to the optical terminal.

8. The method according to claim 7, wherein the PDO configuration information comprises:
a sending periodicity of PDO data, a memory access address of the PDO data, or mapping of a PDO data object.

9. The method according to claim 7, wherein determining, by the optical head end, PDO configuration information of the first slave station comprises:
receiving, by the optical head end, the PDO configuration information of the first slave station from the PLC.

10. The method according to claim 2, wherein the first correspondence is carried in an optical bus link layer message, and the optical bus link layer message comprises:
a destination media access control (MAC) address, a MAC address of the PLC, an Ethernet type, a protocol data unit (PDU) quantity, a timestamp, or a frame check sequence.

11. The method according to claim 1, wherein before sending, by the optical head end, the first node identifier to the optical terminal, the method further comprises:
determining, by the optical head end, a second correspondence, wherein the second correspondence indicates a correspondence between the optical terminal and at least one slave station connected to the optical terminal, and the at least one slave station comprises the first slave station.

12. The method according to claim 1, wherein:
the first node identifier is carried in an optical network terminal management and control interface (OMCI) message, and the OMCI message further comprises a gigabit passive optical network encapsulation mode port identifier (GEMport ID); or
the first node identifier is carried in an operation, administration, and maintenance (OAM) message, and the OAM message further comprises a logical link identifier (LLID).

13. The method according to claim 1, wherein the first node identifier comprises:
a type identifier, a length value, a media access control (MAC) address, or a node identifier.

14. The method according to claim 1, wherein the device information comprises:
a type identifier, a length value, a node identifier, a vendor identifier of the optical terminal or the first slave station, a media access control (MAC) address of the optical terminal or the first slave station, an OT model of the optical terminal, a hardware version of the optical terminal or the first slave station, a software version of the optical terminal or the first slave station, a chip model of the optical terminal or the first slave station, chip revision information of the optical terminal or the first slave station, a chip version of the optical terminal or the first slave station, a chip design date of the optical terminal or the first slave station, or an input parameter obtained in response to a user operation.

15. The method according to claim 1, wherein the method further comprises:
sending, by the optical head end, second indication information to the optical terminal, wherein the second indication information indicates the first slave station to enter an emergency state.

16. The method according to claim 1, wherein after sending, by the optical head end, the first node identifier to the optical terminal, the method further comprises:
sending, by the optical head end, third indication information to the optical terminal, wherein the third indication information requests process data object (PDO) of the first slave station; and
receiving, by the optical head end, the PDO from the optical terminal.

17. The method according to claim 16, wherein the method further comprises:
sending, by the optical head end, the PDO to a programmable logic controller (PLC), wherein determining, by the optical head end, the first correspondence comprises receiving, by the optical head end, the first correspondence from the PLC.

18. The method according to claim 16, wherein before sending, by the optical head end, third indication information to the optical terminal, the method further comprises:
receiving, by the optical head end, the third indication information from a programmable logic controller (PLC), wherein determining, by the optical head end, the first correspondence comprises receiving, by the optical head end, the first correspondence from the PLC.

19. The method according to claim 16, wherein before sending, by the optical head end, third indication information to the optical terminal, the method further comprises:
sending, by the optical head end, fourth indication information to the optical terminal, wherein the fourth indication information indicates the first slave station to enter an operation state.

20. A device, comprising:
an optical transceiver configured to receive a first message from an optical terminal, wherein the first message comprises device information, the device information comprises a first device identifier, and the first device identifier indicates a first slave station connected to the optical terminal;
one or more processors coupled to the optical transceiver; and
a non-transitory computer-readable storage medium storing a program to be executed by the one or more processors, the program including instructions to:
determine a first correspondence, wherein the first correspondence indicates a correspondence between a slave station device identifier and a slave station node identifier; and
determine a first node identifier corresponding to the first device identifier, wherein the optical transceiver is further configured to send the first node identifier to the optical terminal.

* * * * *